United States Patent
Tucker et al.

(10) Patent No.: US 10,850,651 B2
(45) Date of Patent: Dec. 1, 2020

(54) ACTIVE SEAT SUSPENSION SYSTEMS INCLUDING SYSTEMS WITH NON-BACK-DRIVABLE ACTUATORS

(71) Applicant: ClearMotion Acquisition I LLC, Woburn, MA (US)

(72) Inventors: Clive Tucker, Charlestown, MA (US); Ross J. Wendell, Medford, MA (US); Thomas James Cashman, Jr., Rowley, MA (US)

(73) Assignee: ClearMotion Acquisition I LLC, Billerica, MA (US)

( * ) Notice: Subject to any disclaimer, the term of this patent is extended or adjusted under 35 U.S.C. 154(b) by 224 days.

(21) Appl. No.: 15/953,191

(22) Filed: Apr. 13, 2018

(65) Prior Publication Data

US 2019/0315254 A1 Oct. 17, 2019

(51) Int. Cl.
*B60N 2/50* (2006.01)
*B60N 2/54* (2006.01)

(52) U.S. Cl.
CPC ............ *B60N 2/501* (2013.01); *B60N 2/548* (2013.01)

(58) Field of Classification Search
CPC ................................ B60N 2/501; B60N 2/548
USPC ....................... 296/65.01; 297/330
See application file for complete search history.

(56) References Cited

U.S. PATENT DOCUMENTS

| | | | |
|---|---|---|---|
| 4,286,765 A * | 9/1981 | Delgleize | A47C 3/22 248/573 |
| 6,059,253 A | 5/2000 | Koutsky et al. | |
| 2002/0101106 A1 | 8/2002 | Kim et al. | |
| 2006/0261647 A1 | 11/2006 | Maas et al. | |
| 2007/0034768 A1 | 2/2007 | Stenard | |
| 2008/0088165 A1 * | 4/2008 | Deml | B60N 2/501 297/344.12 |
| 2011/0233364 A1 | 9/2011 | Breen et al. | |
| 2013/0275006 A1 | 10/2013 | Ystueta | |
| 2014/0263932 A1 | 9/2014 | Schroeder et al. | |
| 2016/0082870 A1 | 3/2016 | Fujita et al. | |

(Continued)

FOREIGN PATENT DOCUMENTS

EP 2 431 218 A1 3/2012
WO WO 2018/075257 A1 4/2018

OTHER PUBLICATIONS

International Search Report and Written Opinion for International Application No. PCT/US2019/026755, dated Aug. 2, 2019.

*Primary Examiner* — Joseph D. Pape
(74) *Attorney, Agent, or Firm* — Wolf, Greenfield & Sacks, P.C.

(57) ABSTRACT

Embodiments related to active vibration isolation systems for a vehicle seat, as well as their methods of use, are disclosed. In some embodiments, an active suspension system may be configured to support a seat above a floor of a vehicle. The active suspension system may include two or more actuators that may be operated cooperatively to control both the roll and heave of the vehicle seat. In some instances, these actuators may also be non-back-drivable actuators. Additionally, in some embodiments, an active suspension system may include one or more torsion springs that apply torques in parallel with associated actuators of the active suspension system to support at least a portion of the loads applied to the active suspension system during operation.

13 Claims, 17 Drawing Sheets

(56) References Cited

U.S. PATENT DOCUMENTS

2017/0136842 A1 5/2017 Anderson et al.
2017/0203673 A1 7/2017 Parker et al.
2017/0355289 A1* 12/2017 Spangler ............. B64D 11/064

* cited by examiner

ACTIVE SEAT SUSPENSION SYSTEMS INCLUDING SYSTEMS WITH NON-BACK-DRIVABLE ACTUATORS

FIELD

This disclosure relates to an active seat suspension systems that may include non-back-drivable actuators in some embodiments.

BACKGROUND

Active vibration isolation systems can be used with vehicle seats to counteract rolling and jarring motions of vehicle. Many such systems are too large to be used in passenger cars.

SUMMARY

In one embodiment, an active suspension system may be configured to support a vehicle seat relative to a floor of the vehicle. The active suspension system may also include a first non-back-drivable actuator and a second non-back-drivable actuator. The first non-back-drivable actuator and the second non-back-drivable actuator may be configured to be operated cooperatively to control both roll and heave of the vehicle seat.

In another embodiment, a method of operating an active suspension system to support a vehicle seat relative to a floor of the vehicle may include: cooperatively operating a first non-back-drivable actuator and a second non-back-drivable actuator to control both roll and heave of the vehicle seat.

In yet another embodiment, an active suspension system may be configured to support a vehicle seat relative to a floor of the vehicle. The active suspension system may also include a first actuator and a first rocker arm that is operatively connected to the first actuator. The first rocker arm may be constructed to be connected to the vehicle seat, and the first actuator may be constructed to apply a torque to the first rocker arm. The active suspension system may also include a first torsion spring that applies a torque to the first rocker arm.

In still another embodiment, a method of operating an active suspension system to support a vehicle seat relative to a floor of the vehicle may include: applying a first torque to a first rocker arm connected to the vehicle seat with a first actuator; and applying a second torque to the first rocker arm in parallel with the first torque.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
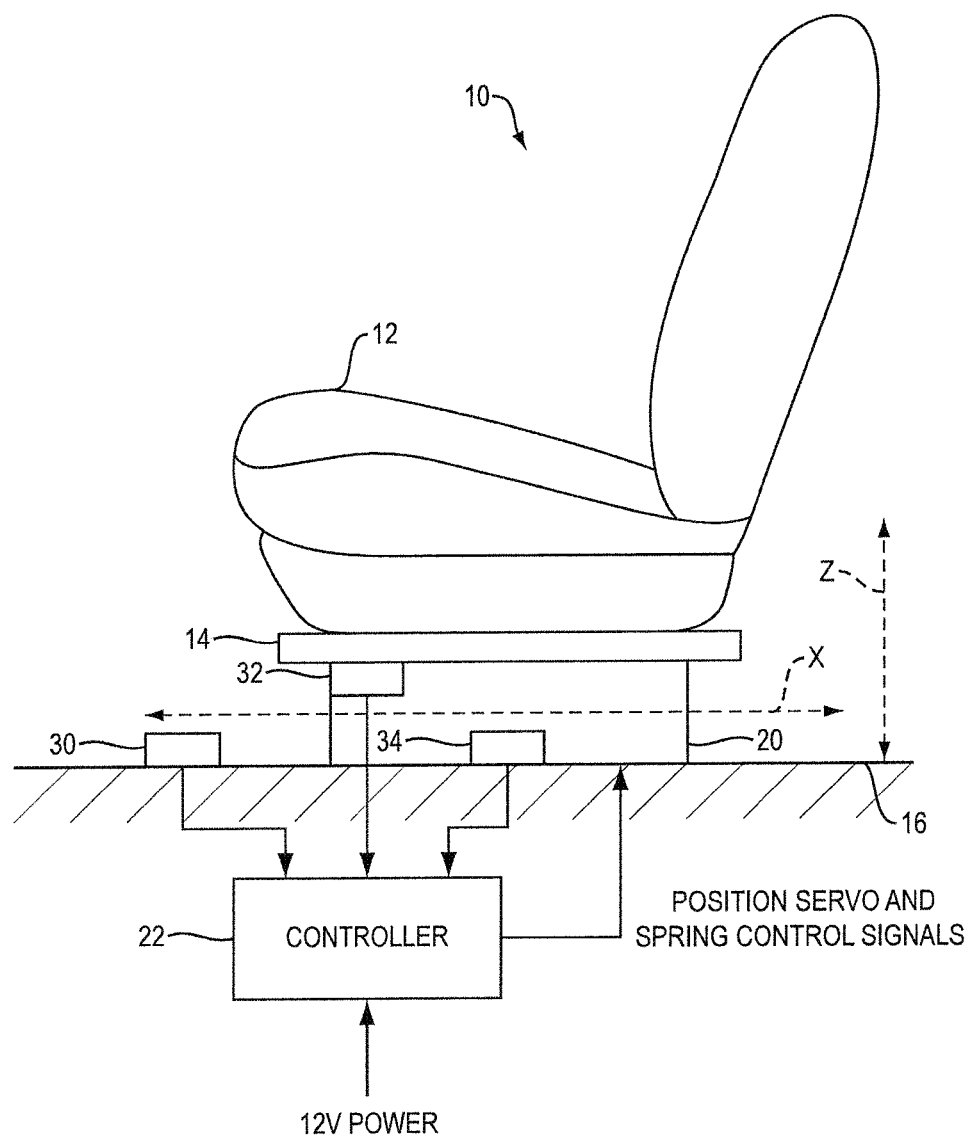
FIG. 1 is schematic diagram of an active vibration isolation system used for a seat of a vehicle.

The Inventors have recognized that prior systems used for mitigating motion of a vehicle occupant have been bulky, complex, and difficult to integrate within the limited space available in passenger vehicles. Additionally, the control of such systems has tended to be rather complex due to the complicated mechanisms and separate systems used for controlling motion of a vehicle occupant. Accordingly, the Inventors have recognized a need for active vibration isolation systems to help mitigate the motion applied to vehicle occupants in various instances. In some applications, these systems may provide relatively reduced complexity and smaller form factors while providing desired force generation amounts and desired response times. However, embodiments in which other benefits and/or a subset of the above noted benefits are realized are also possible.

In view of the above, the Inventors have recognized the benefits associated with an active vibration isolation system that includes an active suspension system with two actuators that are operatively connected to a vehicle seat. Specifically, in some embodiments, the first and second actuators may be constructed and arranged such that they may be actuated in a cooperative manner to control at least one, or both, the roll and heave of an associated vehicle seat at any given time. Thus, the active suspension system may be used to compensate for motion of the vehicle caused by road inputs, driver inputs, and/or other multi-directional accelerations that may be applied to the vehicle. Of course, it should be understood that while only first and second actuators are noted above, embodiments in which more than two actuators are included in an active suspension system of a vehicle seat are also contemplated.

In one embodiment of an active suspension system, first and second actuators may be operatively coupled to two or more rotatable rocker arms connected to opposing sides or portions of a vehicle seat. The actuators may be actuated to rotate the rocker arms. Depending on the combined motion provided by operation of the actuators, this cooperative rotation of the rocker arms may either raise, lower, rotate, and/or provide a combination of the above motions for the associated vehicle seat. Specific embodiments and methods of implementing such a system are described in further detail below.

In addition to the above, in some embodiments, an active suspension system of a vehicle seat may include one or more, and in at least one embodiment, at least two non-back-drivable actuators to control roll and/or heave of an associated vehicle seat. In some instances, all of the actuators included in the active suspension system may be non-back-drivable actuators. In such an embodiment, the non-back-drivable actuators may be operated cooperatively to control one, or both, of roll and heave of the vehicle seat.

The Inventors have recognized multiple benefits associated with the use of non-back-drivable actuators. For example, in one embodiment, a non-back-drivable actuator may support at least a portion, or the entire, weight of a seat and an occupant of the seat without the continued application of torque that might be required from a back-drivable actuator. This may lead to reduced power consumption by the system. Additionally, in some embodiments, a non-back-drivable actuator may be used without a spring, such as an air spring for example and its associated air pump, which may result in a less complicated, less costly, and more reliable design. Due to the elimination of bulky air springs in some embodiments, non-back-drivable actuators may also be used to provide a more compact design that may be more easily accommodated in the limited space located beneath typical vehicle seats. In some embodiments, non-back-drivable actuators, such as worm drives, may also exhibit increased ranges of motion for the overall system as compared to suspension systems including linear actuators. These, and other benefits, are discussed in more detail below in regards to the various embodiments.

As used herein, the term "heave" may refer to motion of a seat in a generally vertical direction relative to the vehicle's frame of reference, which in some embodiments herein may be referred to as movement along a Z-axis of a seat and/or vehicle. For example, when a vehicle is stationary and located on level ground, a vertically oriented axis may extend upwards in a direction that is perpendicular to the level ground. Further, in some embodiments, this vertically oriented axis may also be approximately perpendicular to a direction in which an underlying surface of the vehicle interior generally extends even though a floor of a vehicle interior typically is not flat. In either case, it should be understood that even when a vehicle is no longer located on level ground, terms such as heave, vertical movement, movement along a Z-axis, and/or other similar terms may refer to movement of the seat in a direction that is parallel to this vertical axis which may remain approximately vertical relative to the vehicle's frame of reference. Thus, a vertical axis of a vehicle and/or seat, as well as the associated types of movement noted above, may be understood to be a vertical axis fixed relative to a reference frame of the vehicle, not a global reference frame.

As used herein, the term "roll" may refer to the rotational motion of a seat about an axis that is parallel to a generally longitudinal axis of the vehicle passing from a front to a rear of the vehicle. In some embodiments, this may be referred to as roll of a seat or rotation of the seat about an X-axis of the seat, seat base or vehicle. For example, when a vehicle is, not loaded, stationary and located on level ground, a longitudinal axis of the vehicle may pass from a front of the vehicle to a rear of the vehicle in a direction that is generally parallel to the ground. The seat may then rotate, or roll, about an axis that extends in a direction that is parallel to this longitudinal axis of the vehicle. Further, even when the vehicle is not located on level ground, this longitudinal axis still passes from a front of the vehicle to a rear of the vehicle relative to the vehicle's frame of reference regardless of the vehicle's global orientation.

For the sake of clarity, the embodiments described herein are primarily direct to rotation of a vehicle seat to change a roll of the vehicle seat, i.e. rotation of the seat about an axis parallel to a longitudinal axis of the vehicle. However, embodiments in which the disclosed active suspension systems are used to control rotation of the vehicle seat about a different axis that is generally parallel and/or perpendicular to an underlying surface of a vehicle interior are also contemplated. For example, the disclosed active suspension systems may also be used to control a pitch of a vehicle seat as well as rotation about any other appropriate axis as the disclosure is not limited in this fashion.

Turning now to the figures, several non-limiting embodiments are described in further detail. While specific combinations of various features, components, and systems are described relative to the figures, should be understood that the current disclosure is not limited to only the depicted embodiments. Instead, combinations of the various features, components, and systems are contemplated as the disclosure is not limited in this fashion.

An active vibration isolation system may be used to maintain the height of a seat base constant in space as the vehicle moves up and down and rolls, and also can be used to maintain the user's torso or head in a substantially constant lateral and/or vertical position as the vehicle moves up and down and rolls. A substantially constant position may correspond to maintaining a lateral and or vertical position within about 3 inches, 2 inches, 1 inches, 0.5 inches, and/or any other appropriate distance relative to an initial position of a user's torso or head. These motions can be accomplished, within system limits, independently of the user's weight. Further, the system open-loop transfer function is largely independent of the weight carried by the seat, leading to a simple and robust controller design. Of course, other methods of operating an active vibration isolation system and associated active suspension system to control motion of a seat and a user are also contemplated.

In one embodiment, an active vibration isolation system 10, FIG. 1, is adapted to control motions of vehicle seat 12 (via seat base 14 that supports seat 12) relative to vehicle floor 16. Active suspension system 20 supports seat base 14 above floor 16. Active suspension system 20 is adapted to move seat base 14 up and down in the direction of vertical axis Z. Active suspension system 20 is also adapted to rotate seat base 14 in both directions (left and right) about horizontal, forward-facing axis X.

Active vibration isolation system 10 can in one non-limiting example be operated with the aim of maintaining the lateral (side-to-side) position of the upper torso/head of a person sitting in seat 12 while the vehicle undergoes rotations about a forward vehicle axis that is parallel to or coincident with axis X (such rotations also known as vehicle "roll"). This user lateral position control is further described in US Patent Application Publication 2014/0316661, entitled "Seat System for a Vehicle," the disclosure of which is incorporated herein by reference. Accordingly, user lateral position control will not be further described herein. System 10 can be operated in other manners (with other control algorithms). For example, system 10 can be operated to move the occupant (via the seat), or to move the seat per se, in other prescribed (pre-calculated) manners.

Active suspension system 20 may also adapted to translate seat base 14 up and down parallel to the vertical (Z) axis. Active vibration isolation system 10 can in one non-limiting example be operated with the aim of maintaining seat base 14 (and thus seat 12 and a person sitting in seat 12) at a constant height in space while vehicle floor 16 moves up and down as the vehicle travels over a surface. As described above relative to lateral positioning, seat translations can be designed to achieve other motions or other goals.

A system 10 may also include a sensor 30 (which may comprise one or more physical sensing devices) mounted to the vehicle (in this non-limiting example, mounted to vehicle floor 16). Sensor 30 may be an absolute sensor that, alone or in conjunction with operations performed by controller 22, senses vehicle rotational position changes about axis X (or, an axis parallel to axis X), and vehicle height position changes along (or parallel to) axis Z. System 10 may also include a seat position sensor 32 (which may comprise one or more physical sensing devices) that may preferably be a relative sensor that, alone or in conjunction with controller 22, determines the seat roll position relative to the vehicle about axis X (or, an axis parallel to axis X), and the seat translational position relative to the vehicle along (or parallel to) axis Z. System 10 may also include optional seat neutral position sensor 34 (which may comprise one or more physical sensing devices) that may preferably be a relative sensor that, alone or in conjunction with controller 22, determines "neutral" seat Z axis and roll positions. Neutral position sensor 34 can be enabled to change its output state at the mid positions of the seat in roll and Z. Accordingly, it can also provide knowledge of whether the seat is above or below the mid height position, and whether the seat is to the left or right of the seat horizontal (i.e., roll neutral) position. Neutral position sensor 34 can also be used to re-calibrate system 10 each time the seat moves through either of these neutral positions, as is further explained below. In cases where system 10 includes sensors 30 and 32 but not sensor 34, sensor 32 could be an absolute calibrated sensor so that it can be used to report the actual seat position, which also provides information concerning the seat position relative to the height and roll neutral positions.

In the depicted embodiment, a controller 22 may receive the outputs of sensors 30 and 32 (and the output of sensor 34 when sensor 34 is used) and in response provide appropriate control signals to active suspension system 20 so as to achieve the results of the particular active seat position control algorithms that are designed into system 10. Non-limiting examples of the goals of such algorithms are described above. One specific non-limiting example is to maintain (as best as possible) the user's head/torso lateral position and the user's Z position as the vehicle undergoes rotations about axis X and translations along axis Z. Though other control methods are also contemplated as the disclosure is not limited to any particular control strategy. Power for the controller and the active suspension system is typically provided via the vehicle electrical system, commonly at 12V, with appropriate conditioning and the like to meet the requirements of system 10.

Figure 2:
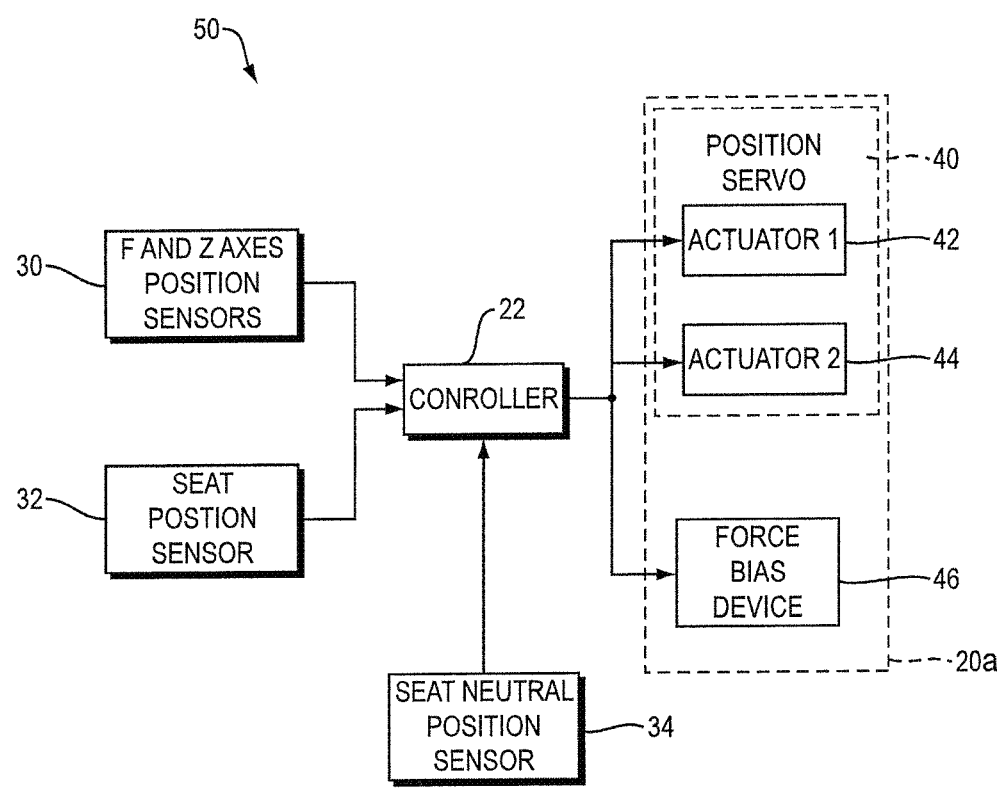
FIG. 2 is a functional block diagram of one example of the system of FIG. 1.

One embodiment of a functional block diagram of an active vibration isolation system 50 is depicted in FIG. 2. System 50 differs from system 10, FIG. 1, in that active suspension system 20a in this case includes seat position servo 40 and force bias device 46. A force bias device is a passive suspension device such as a spring, but with an adjustable spring force. One goal of the force bias device is to support the seat and user in a nominal neutral position while the vehicle is at rest, so that the active suspension does not need to be engaged at all times, which saves vehicle power. This also saves vehicle power when the active suspension is operated, as much of the weight is supported by the force bias device so that the actuators do not need to produce as much force. Several examples of force bias devices for active vehicle seat control are further described in U.S. Pat. No. 8,095,268, issued on Jan. 10, 2012, the disclosure of which is incorporated herein by reference. A specific embodiment of a force bias device including torsion springs is detailed further below. Seat position servo 40 may be a high bandwidth position servo that is adapted to control the roll and Z axis positions of the seat. Servo 40 is able to create (within limits) forces to maintain the desired seat positions. In this example, position servo 40 may include two actuators; a first actuator (42) and second actuator (44). Actuators 42 and 44 can be of any design and construction that is capable of moving the seat in the desired directions. In this non-limiting example the actuators are back-drivable linear actuators. However, embodiments in which non-back-drivable and/or rotary actuators may be used are also contemplated.

Figure 3:
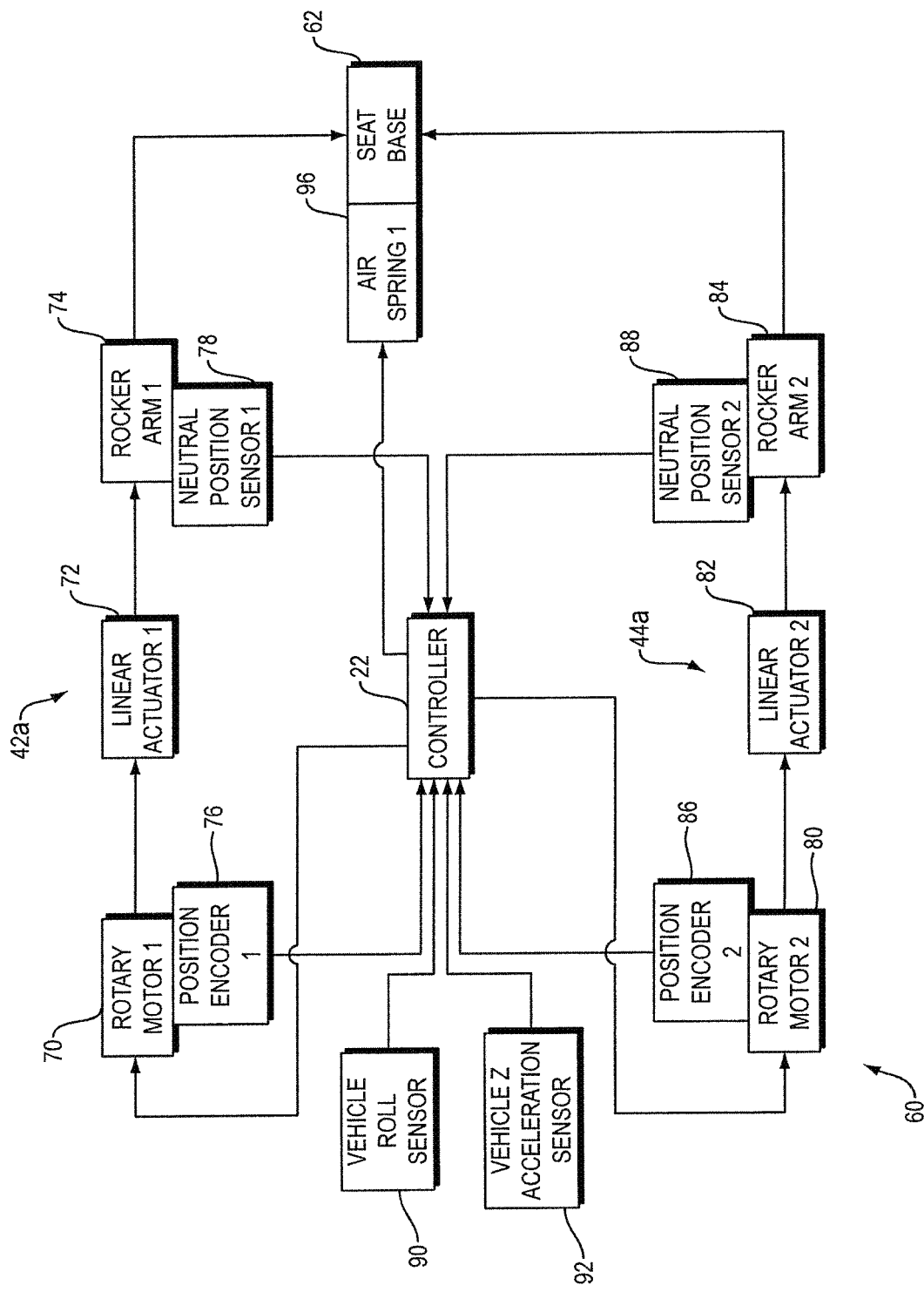
FIG. 3 is a more detailed functional block diagram of another example of the system of FIG. 1.

A more detailed block diagram of one embodiment of an active vibration isolation system 60 is shown in FIG. 3. Actuators 42a and 44a in this non-limiting example each comprise a rotary motor (70, 80) that drives a linear actuator (72, 82) which in turn moves a rocker arm (74, 84) that is directly or indirectly mechanically coupled to seat base 62. The use of two separately controlled actuators allows control of both the vertical and roll positions of the seat base, and thus the seat and the person sitting in the seat. This is further described below.

Position encoders 76 and 86 may be relative sensors that measure the rotational positions of motors 70 and 80, respectively. Controller 22 may be programmed to calculate from the encoder data the seat position relative to the vehicle in both Z and roll. Neutral position sensors 78 and 88 (when used) may also preferably be one-bit Hall sensors at top dead center (neutral position) of each of the rocker arms. Sensors 78 and 88 accordingly may produce output signals each time the respective rocker arm moves through the neutral position; these data can be used to help determine which direction(s) to move the seat, and also to calibrate the system on the fly so as to maintain the accuracy of the seat position calculations in both Z and roll. FIG. 3 also illustrates the use of an air spring 96 as a force bias device. The air spring may also use a pressure source and a valve (not shown). An alternative would be to use one or more torsion springs, as further described below, or other springs with adjustable spring forces. Additionally, more than one force bias device could be used, and more than one type could be used (e.g., an air spring and one or more torsion springs).

Controller 22 may receive signals from a vehicle roll sensor (which may be a rate gyroscope) 90, vehicle Z axis accelerometer 92, position encoders 76 and 86, and/or neutral position sensors 78 and 88. The gyro input may be integrated, and the accelerometer input may be double integrated, to obtain the rotational and vertical displacement signals. Controller 22 may output in response to all of its inputs, control signals for rotary motors 70 and 80, and control signals to the valve for air spring 96. These control signals are designed to achieve user position control as prescribed by the appropriate control algorithm. In one example control algorithm described above, the lateral and/or vertical positions of a user may be maintained. To accomplish this, seat base 62 may be moved so as to, in limit, maintain its z position in space as the vehicle moves up and down and rolls, and seat base 62 is also moved so as to, in limit, maintain the user's torso or head in a constant lateral position as the vehicle moves up and down and rolls about the forward vehicle axis parallel to or coincident with the X axis. Different seat base motions could be commanded so as to accomplish other control algorithms.

Within limits, system 60 may accomplish these above noted motions independent of the user's weight. In some embodiments, system 60 may be able to maintain the static seat height independently of the user's weight because the spring (e.g., the air spring or the torsion bar spring) is able to provide a spring force to match the user's weight. Also, the operation of system 60 is largely independent of the spring rate and the natural frequency of the user on the seat. In contrast, prior systems such as that described in US Patent Application Publication No. 2006/0261647 attempt to preserve a natural frequency of the user on the seat, regardless of the user's weight, by using a progressive spring rate spring. The heavier the user the further the spring is compressed in order to reach a section of the spring with a greater spring rate. Accordingly, the static compression of the spring is dependent on the user's weight, and so the static seat height is also dependent on user weight.

The operation of controller 22 may also be largely independent of a user's weight. For example, system 60 may use position sources rather than force sources for example, and without wishing to be bound by theory, with a force source the user's weight is a large contributor to the system dynamics: as the actuator motion ratio increases, the moving mass of the actuator itself becomes of greater significance in determining the system dynamics while the mass of the user becomes of lesser significance to the system dynamics. In contrast, in the disclosed systems where position sources may be used in some embodiments, the motion of the actuator may be largely independent of the payload (either the weight of the user or the moving mass of the actuator) and only commands to the controller. This may provide a simpler, more robust controller design.

System 60 may also be adapted to manage the end of range of travel regions so as to minimize jarring motions that might occur when the vehicle experiences excursions that would result in greater roll or z axis motion than the system is able to accomplish. For example, if the vehicle is driven over a deep pothole at relatively high speed the vehicle floor will move down quickly and substantially. System 60 will extend the seat suspension upward, with the goal of maintaining the seat at a constant height in space. However, the upward travel is inherently limited by the construction of the seat suspension. The same applies for downward travel, and the left and right roll limits. In order to soften any jarring that might occur if the seat is moved quickly to its end of travel range (in the Z and/or X axes), controller 22 may be adapted to "harden" or "stiffen" the seat suspension as end of travel range is approached. Such stiffening could be progressive, so as to prevent the seat from ever reaching the end of travel range. Or, the system could allow the end of travel range to be met, but in a manner that slows the seat velocity as the end of range is approached. Since system 60 uses a position servo rather than a force source, such stiffening could be accomplished by reducing the amount of seat translation per vehicle displacement (as determined from the accelerometer signals).

Details of one non-limiting example of active suspension system 20b for the active vibration isolation system are shown in FIGS. 4-7. Actuators 42a and 44a are held in place by box-shaped support frame 91 that comprises opposing front 97 and rear 98 portions as well as opposing sides 99 and 103 that extend between the front and rear portions of the frame. Actuators 42a and 44a are linear actuators. Linear actuators could be accomplished in any desired manner, such as with linear motors, or, as described below, with rotary motors that drive rotary to linear converters. Rotary to linear converters are known in the art, and may comprise, for example, ball screw assemblies, lead screws or worm drives. Additionally, as detailed further below, in some embodiments, the actuators may be non-back-drivable actuators.

Actuator 42a may comprise rotary motor 70 with its output coupled to ball screw assembly 72a that converts input rotary motion to output linear motion. The coupling of the motor to the ball screw assembly (not shown) can be accomplished using a cogged belt or v-belt or chain, or any other such coupling as would be known in the art such as a gear train or direct coupling; this coupling may be protected by guard 85. Ball screw assembly 72a output shaft 113 is coupled to rocker arm 74a. The other end of the ball screw assembly may be fixed to frame 91. Rocker arm 74a comprises link 100 (with rotational axis 101) that is fixed to bar 102 (with rotational axis 180). Links 104 and 106 are fixed to and extend from bar 102, and have distal ends 105 and 107. As explained below, the seat is (indirectly) coupled to ends 105 and 107. Rocker arm 74a translates linear input motion to rotational output motion. Actuator 44a may comprise rotary motor 80 with its output coupled to ball screw assembly 82a that converts input rotary motion to output linear motion. The coupling of the motor to the ball screw assembly can be accomplished using a cogged belt or v-belt or chain, or any other such coupling as would be known in the art such as a gear train or direct coupling; this coupling is protected by guard 83. Ball screw assembly 82a output shaft 109 is coupled to rocker arm 84a. The other end of the ball screw assembly is fixed to frame 91. Rocker arm 84a comprises link 110 (with rotational axis 111) that is fixed to bar 112 (with rotational axis 182). Links 114 and 116 are fixed to and extend from bar 112. Pivoting links 118 and 120 are pivotally coupled to the ends of links 114 and 116, and are adapted to rotate about axis 130. As explained below, the seat is (indirectly) coupled to ends 119 and 121 of links 118 and 120, along axis 123. Rocker arm 84a translates linear input motion to rotational output motion.

While rocker arms corresponding to a bar with radially extending links attached thereto has been depicted in the figures, it should be understood that a rocker arm may correspond to any appropriate rotatable structure that is rotatable about a rotational axis of the structure and that includes one or more portions that extend radially outward from the rotational axis and that may be operatively connected to a base of a corresponding seat. Accordingly, rotation of the rocker arm may be translated into vertical displacement of the portion of the seat base connected to the radially extending portion, or portions, of the rocker arm.

Figure 8:
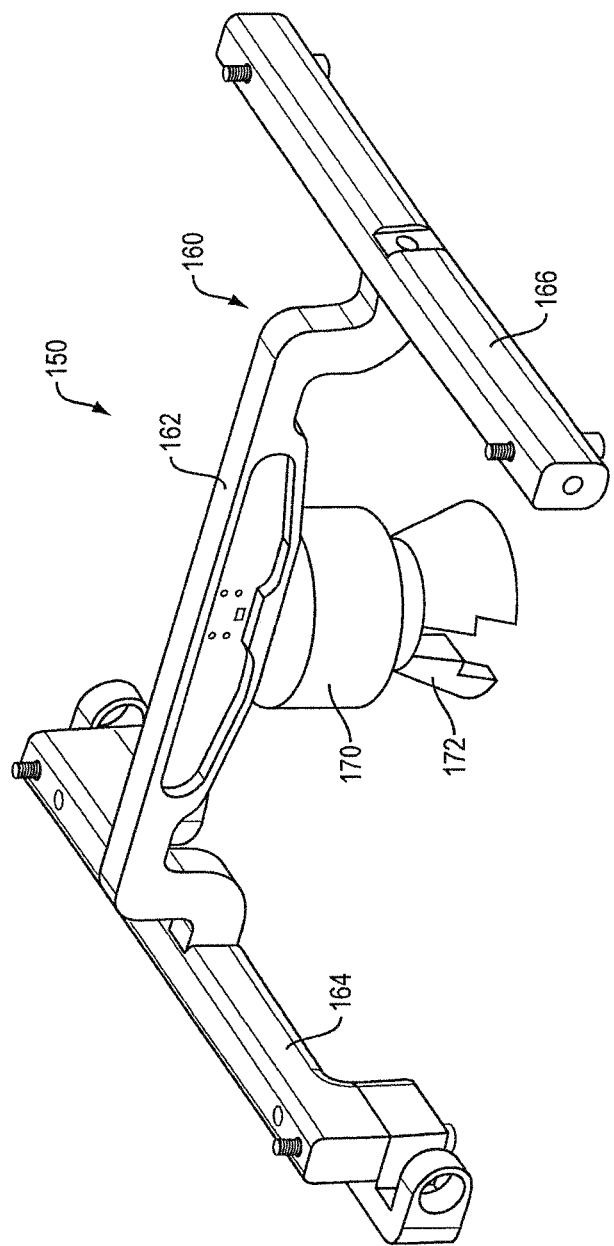
FIG. 8 is a top perspective view of a seat support/air spring assembly for an active vibration isolation system.
Figure 9:
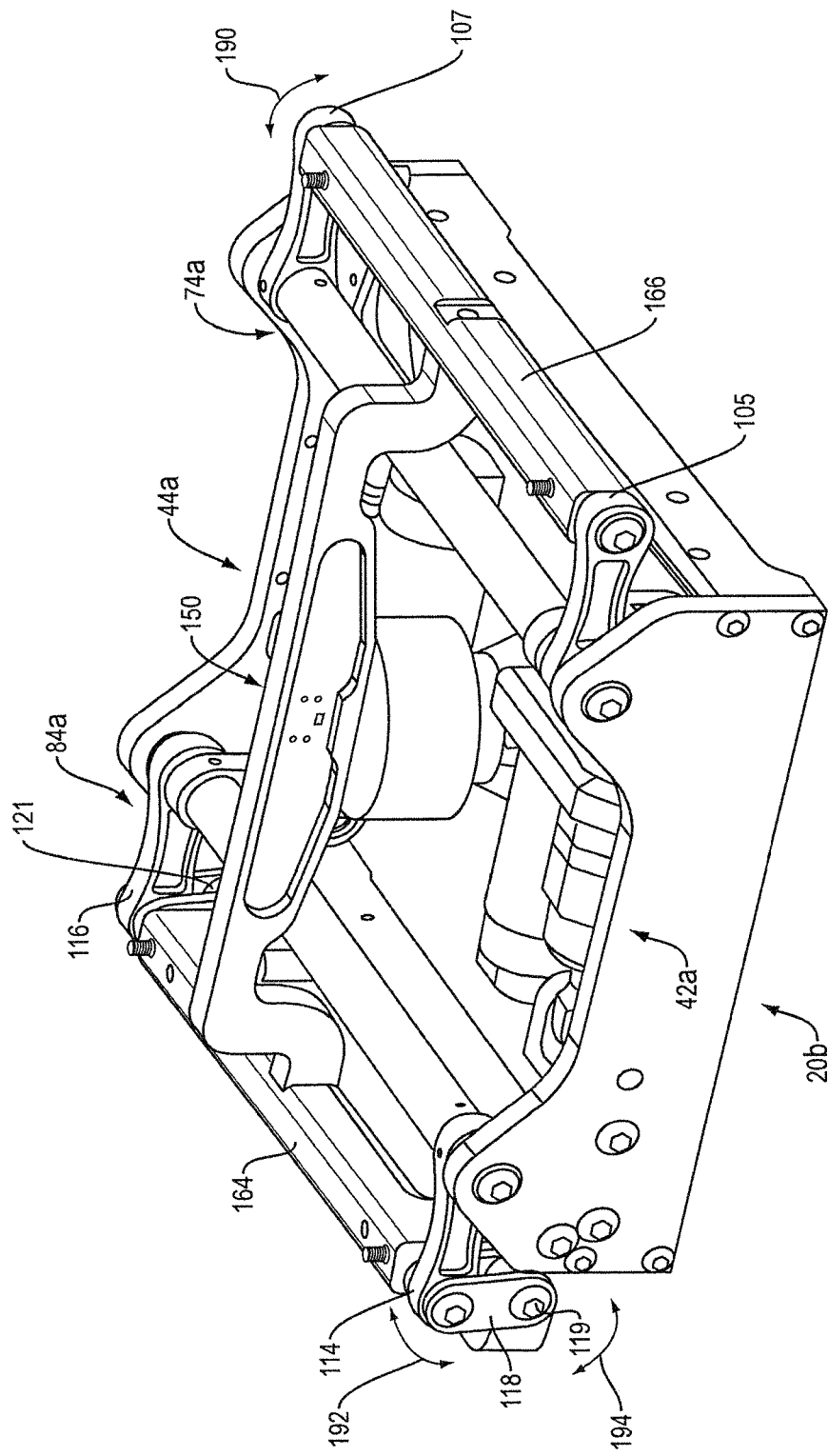
FIG. 9 shows the seat support/air spring assembly of FIG. 8 mounted to the active suspension system of FIG. 4.

One embodiment of a seat support/air spring assembly 150 is shown by itself in FIG. 8, and is shown mounted to active suspension system 20b in FIG. 9. Assembly 150 comprises rigid mechanical seat support 160 that itself comprises central member 162 and seat supporting cross members 164 and 166. Air spring 170 is coupled to the bottom of member 162, and is supported on the vehicle floor (not shown) by load spreader 172. As shown in FIG. 9, member 166 is coupled to link ends 105 and 107 such that when rocker arm 74a is rotated, member 166 moves along arc 190. Member 164 is coupled to link ends 119 and 121. When rocker arm 84a is rotated, links 116 and 118 are moved along arc 192. Link ends 119 and 121 are able to rotate about arc 194. Pivoting links 118 and 120 are needed to translate the arcuate motions of the ends of the rocker arm to vertical motion of the seat.

Figure 10:
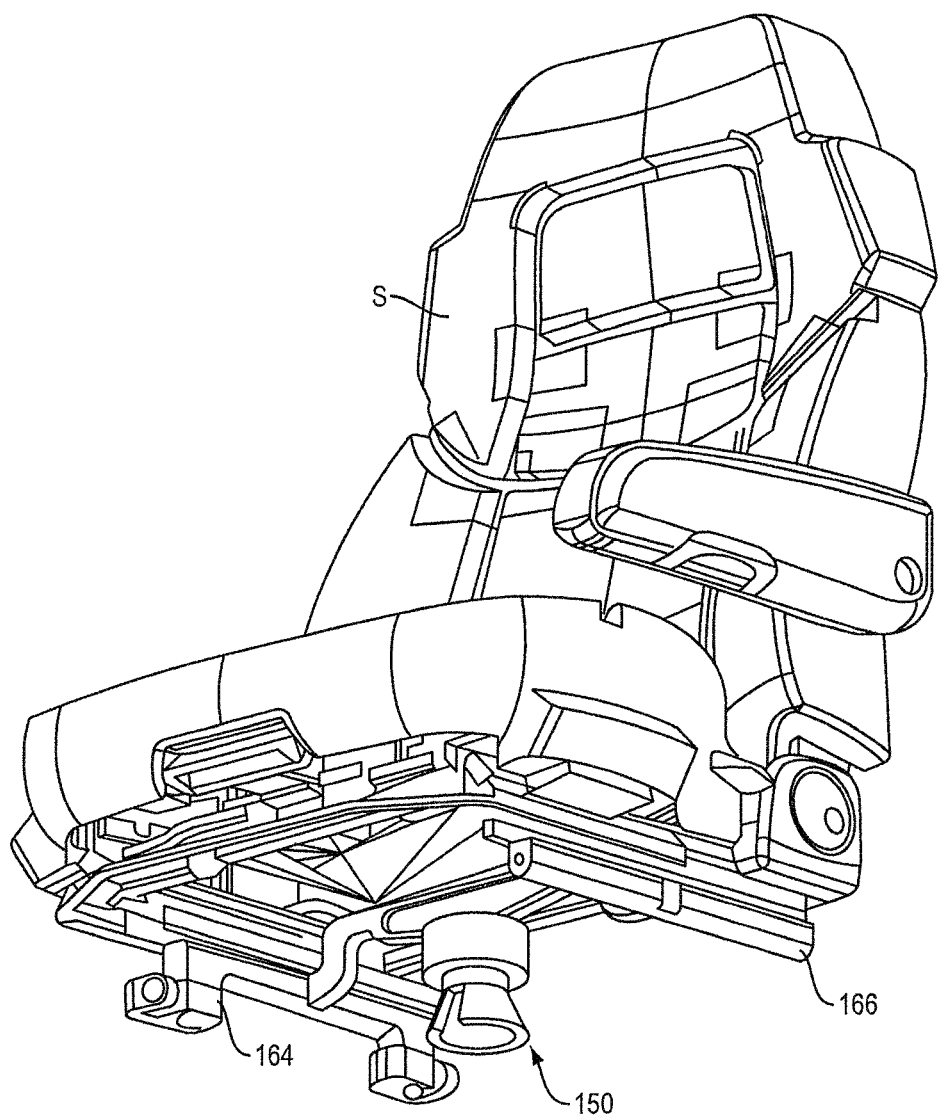
FIG. 10 is a bottom perspective view of the seat support/air spring assembly of FIG. 8 mounted to a seat.

FIG. 10 shows an embodiment of a seat support/air spring assembly 150 mounted to the bottom of seat S. Since members 164 and 166 can be independently moved up or down by active suspension system 20b, the seat is able to pivot both ways about axis X and translate up and down along axis Z (FIG. 1). For example, when both actuators are extended the seat moves up, and when one is extended and one retracted the seat rolls. If only one is extended the seat motion is partially translational and partially a roll. Thus, the active vibration isolation system is able to move the seat so as to maintain the user's head/torso in a fixed translational (side-to-side) position and maintain the seat (and thus the user's head) at a constant height in space (both, to limits) while the vehicle rolls and translates up and down, though other control schemes are also contemplated as noted previously.

In one embodiment the force bias device is accomplished partially or completely with one or more torsion springs. A torsion spring can be accomplished with a torsion bar, which can be mounted within bar 102 and/or bar 112. Though external mountings of a torsion bar and/or torsion helical spring may also be used. Such torsion bars would act on the seat through the ends of the rocker arms. The force provided by a torsion spring can be adjusted by changing the degree of twist imparted to the spring. A specific embodiment of such a device is detailed further below.

When rotary motors and ball screw assemblies are used in combination as linear actuators, the motors can be small 12V electric motors with high motion ratio such that a small amount of power can produce a small amount of motor output torque, but result in a high force output via the ball screw assembly. The ball screw assemblies can be effectively non-back-drivable devices so that the actuators hold their positions well. One result of this arrangement, and the horizontal orientations of the motors and ball screw assemblies, is that the active suspension system (which is located between the seat and the vehicle floor) has a low profile—perhaps in the range of about 8-10 cm. This lends itself to use of the active vibration isolation system in all kinds of vehicles, including vehicles with little headroom such as passenger cars.

Figure 11:
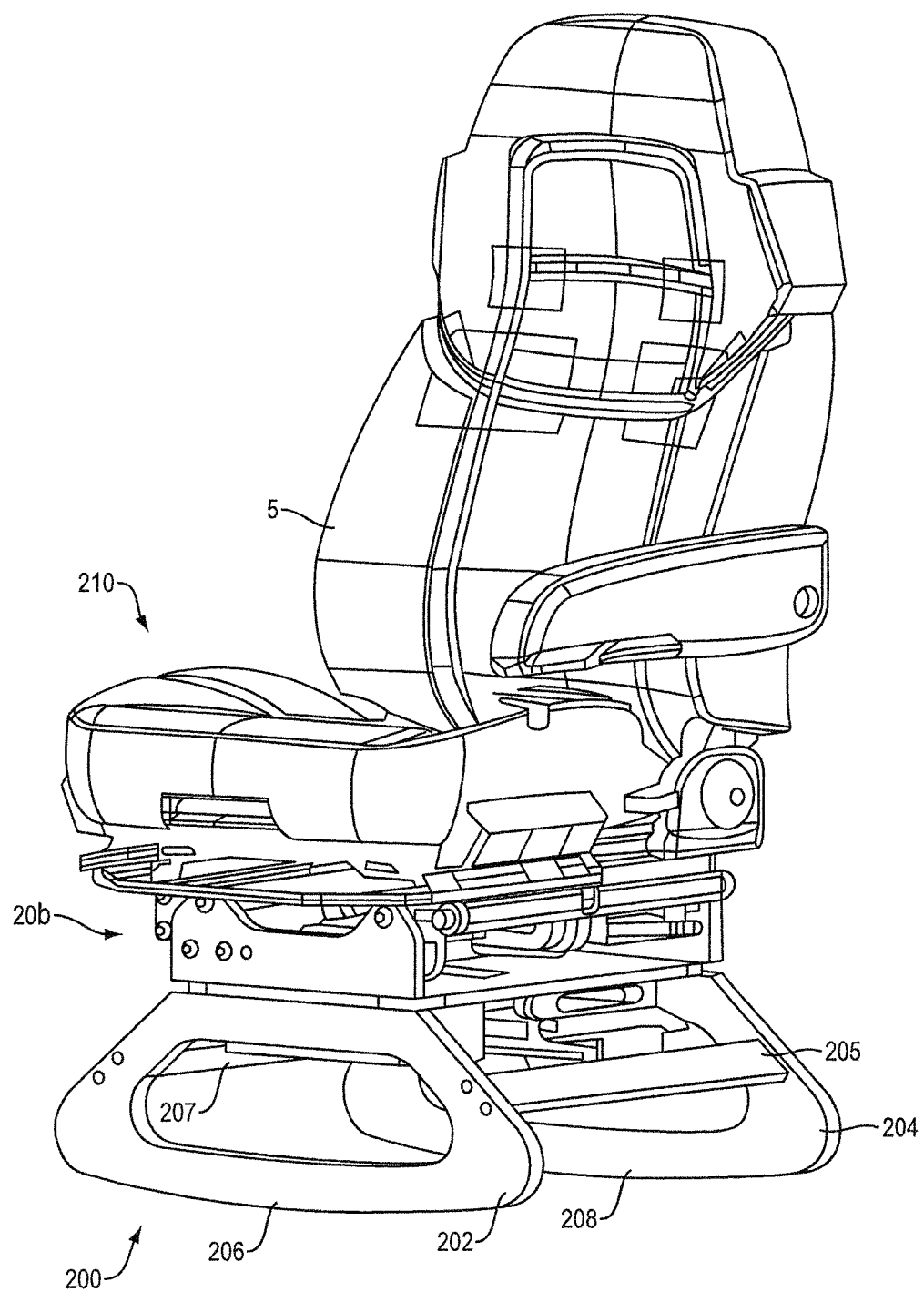
FIG. 11 is a perspective view of a demonstration system for the active vibration isolation system.

FIG. 11 is a perspective view of a demonstration system 210 for including one embodiment of an active vibration isolation system. The demonstration system is constructed and arranged to demonstrate the motions that can be accomplished by an active vibration isolation system, such as the systems described above. System 210 is in one use situation able to easily replicate vehicle roll, and can demonstrate the responses to roll of active suspension system 20b. Vehicle roll is replicated by the use of rocker platform 200 that is coupled below active suspension system 20b, such that platform 200 rests on the floor. Rocker members 202 and 204 may have curved bottom surfaces 206 and 208. Cross-members 205 and 207 may help to maintain rigidity. This construction of rocker platform 200 allows the seat S to move side to side, like a sideways rocking chair. Movement can be accomplished in a desired manner, for example by pushing on one side of seat S. If the active suspension system is engaged, it may be operated to cause motions of the seat aimed to maintain the lateral position of the user's head or torso as the seat is pushed. In an alternative arrangement the active suspension system can be turned on after the rocking motion has begun, so the user can feel the rocking motion (roll) and then the system's response to the roll. In yet another alternative use situation, active suspension system 20b can be commanded to cause motions of the seat that initiate the side-to-side rocking motion (a "self-actuated mode"). The self-actuated mode can be used as desired, for example to draw attention to the demonstration system in a vehicle showroom or the floor of a trade show. System 210 can be accomplished simply by providing rocker platform 200 and programming the controller to achieve the desired motions. Appropriate power supplies (e.g., 120V to 12V adapters) may also be needed.

Figure 4:
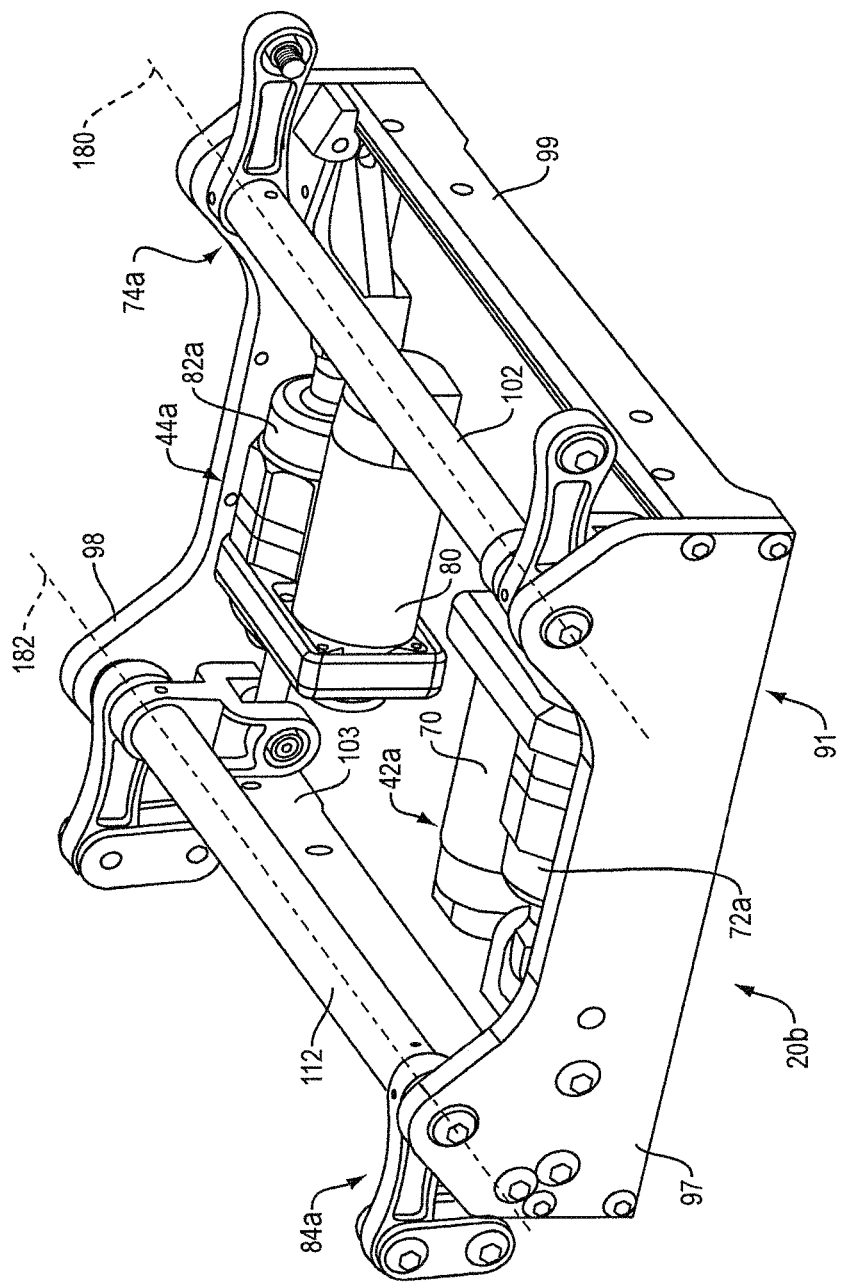
FIG. 4 is a top perspective view of an active suspension system for the active vibration isolation system.
Figure 5:
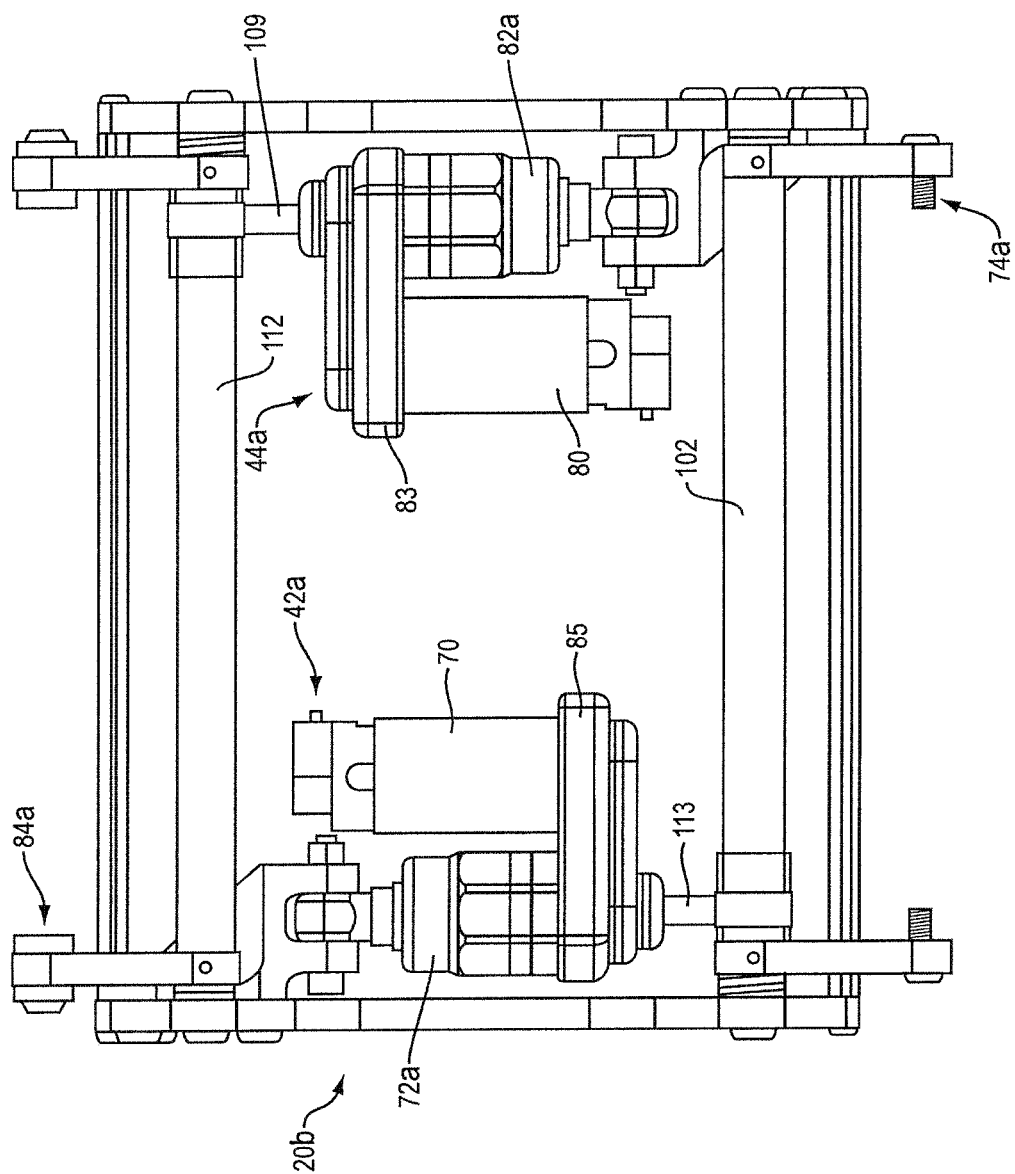
FIG. 5 is a top view of the active suspension system of FIG. 4.
Figure 6:
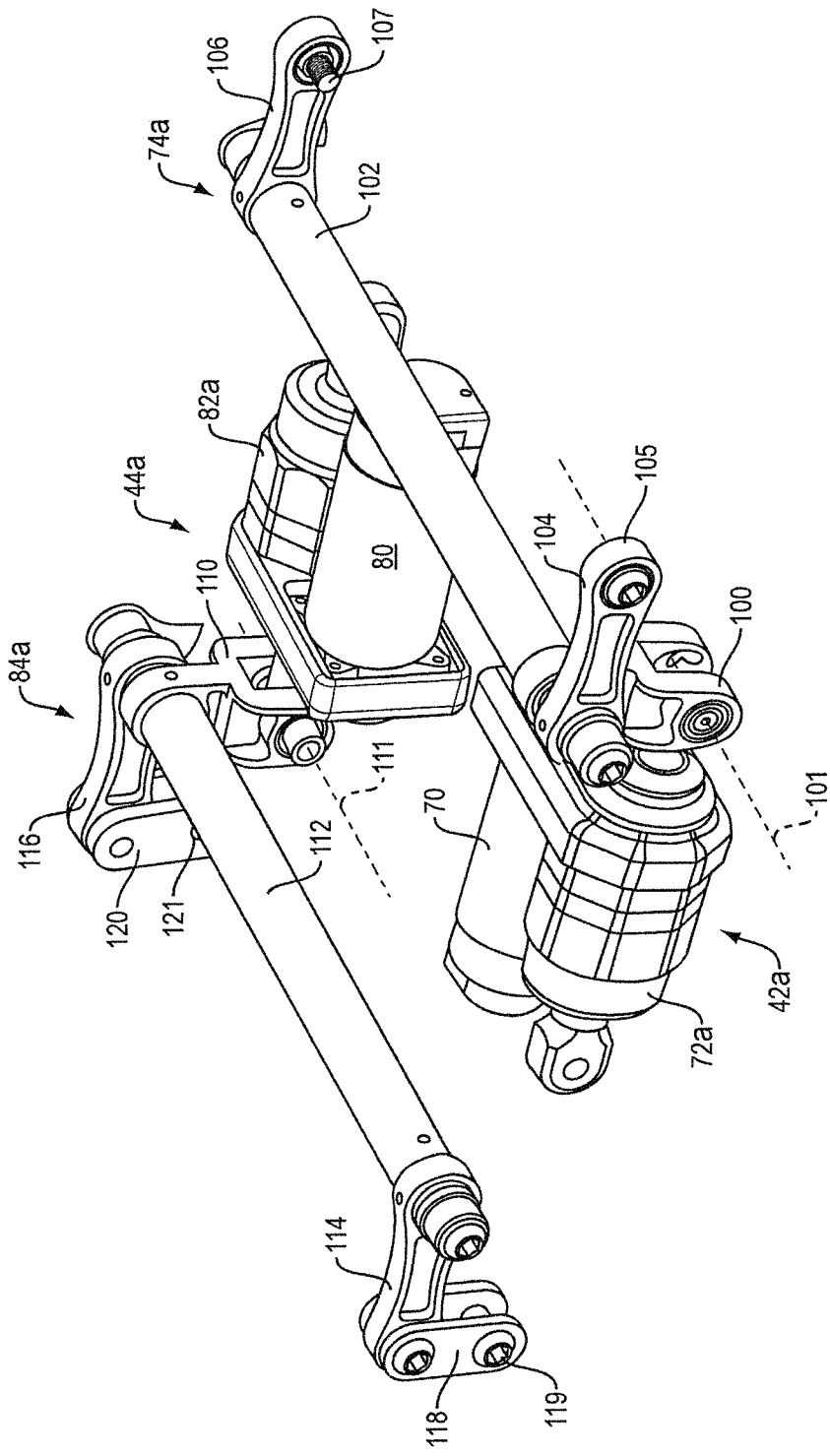
FIG. 6 is a partial view, showing the actuators of the active suspension system of FIG. 4.
Figure 7:
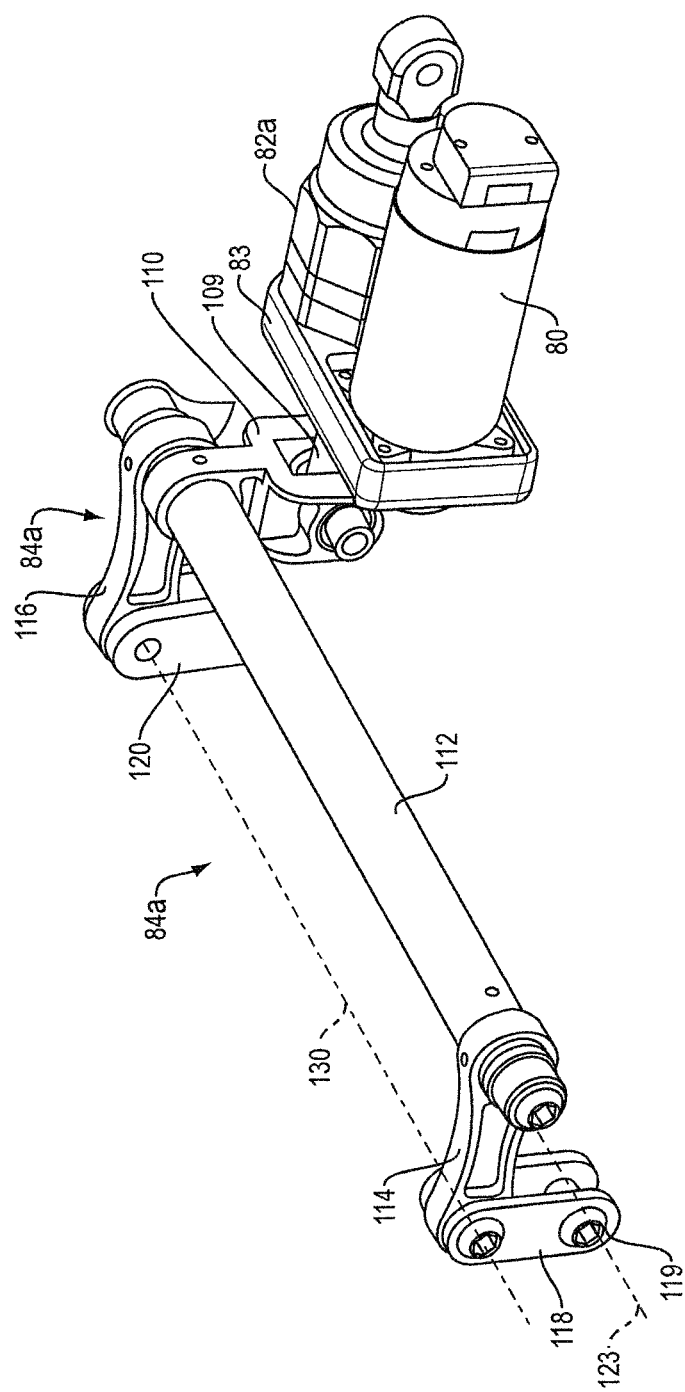
FIG. 7 is a detailed view of one actuator of the active suspension system of FIG. 4.
Figure 12:
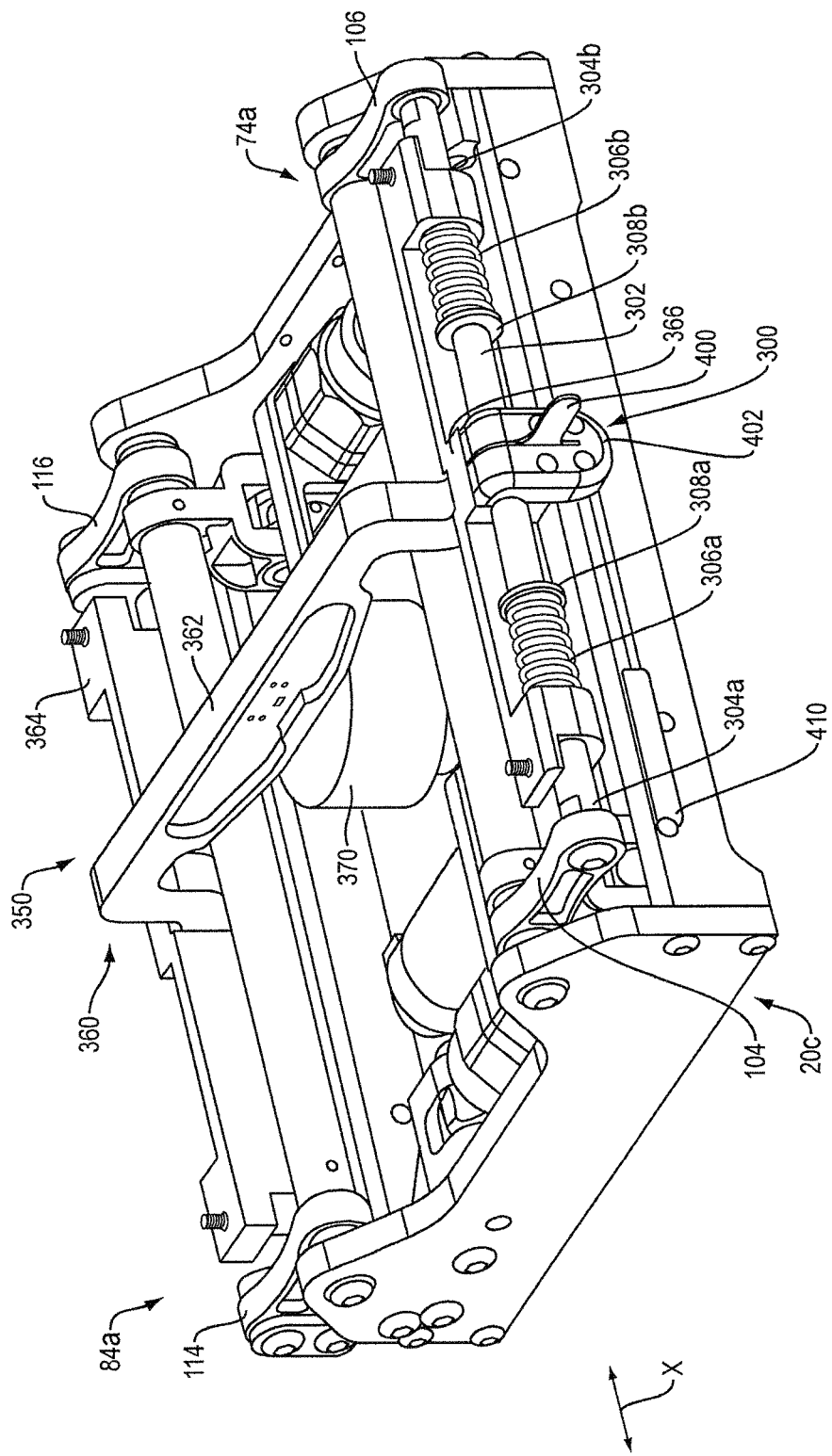
FIG. 12 is a top perspective view of another example of an active suspension system for the active vibration isolation system.

FIG. 12 is a perspective view of another example of one embodiment of an active suspension system 20c. System 20c differs from active suspension system 20b, FIG. 4, in that active suspension system 20c may include a passive isolation stage 300. In some implementations, when the disturbances in the Z and roll directions are mitigated, the most significant remaining component of disturbance is in the fore-aft or X-direction. The passive isolation stage 300 included in the system 20c may serve to mitigate these fore-aft vibrations. The seat S (FIG. 10) mounted to the active suspension system 20c may move along the fore-aft direction as described below. Each side of the passive isolation stage 300 (only a single side is visible in FIG. 12) includes a shaft 302, mounted between the links 104, 106 of rocker arm 74a and between the links 114 and 116 of rocker arm 84a (FIGS. 4 and 6).

As also shown in the depicted embodiment, two linear sleeve bushings 304a, 304b may be disposed along the shaft 302 and enable the isolation stage 300 (and the seat S connected thereto) to move along the axis of the shaft 302 in the fore-aft direction. Springs 306a, 306b are mounted between the cross members 364, 366 of the rigid mechanical seat support 360 (described in more detail with respect FIG. 13 below) and spring fasteners 308a, 308b affixed to the shaft 302. Springs 306a and 306b provides restorative force to bias the seat S toward the center of the range of travel in the fore-act direction when not being disturbed. When the vehicle undergoes fore-aft motions, the linear sleeve bushings 304a and 304b and the springs 306a and 306b absorb the relative motion and allow the seat S to remain largely stationary while the vehicle oscillates fore-aft.

Figure 13:
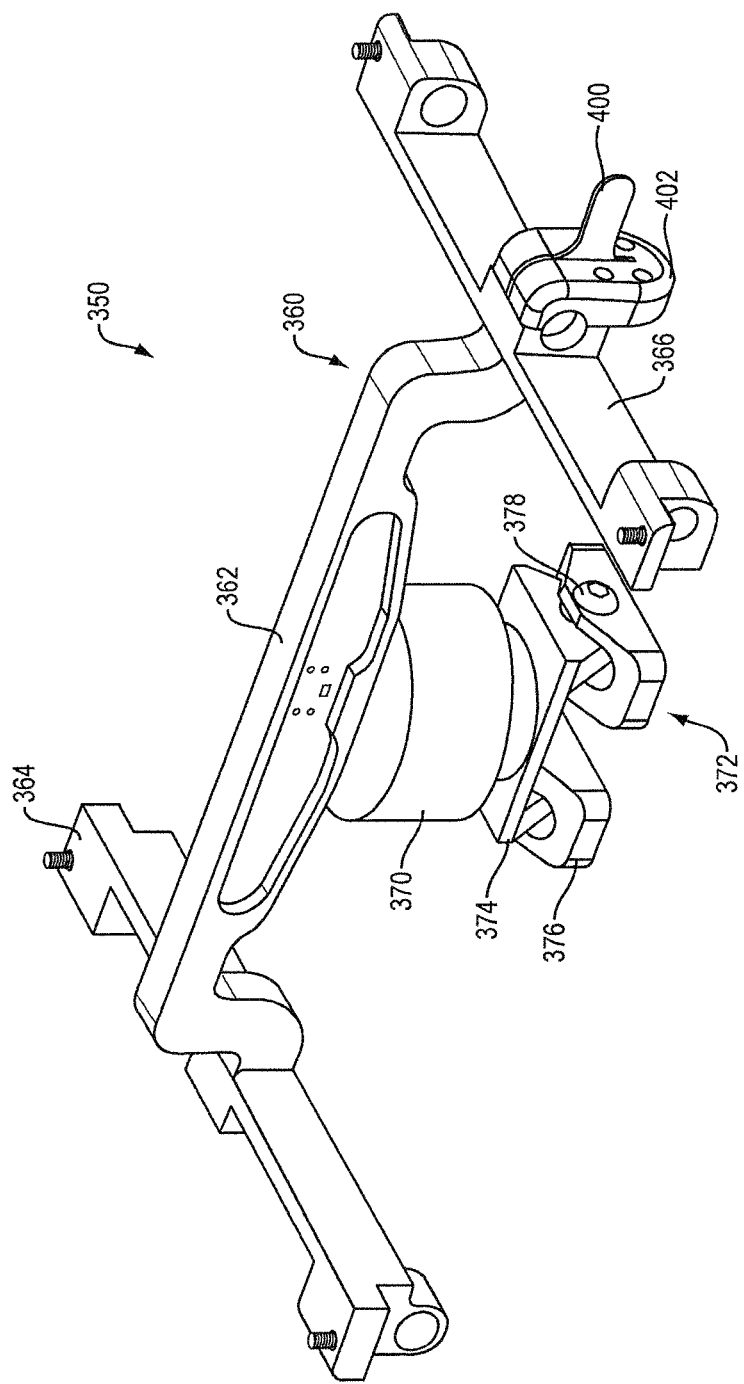
FIG. 13 is a top perspective view of a seat support/air spring assembly for the active suspension system of FIG. 12.

FIG. 13 is a top perspective view of an embodiment of a seat support/air spring assembly 350 for the active suspension system of FIG. 12. The support/air spring assembly 350 is comparable to the seat support air spring assembly 150 (FIGS. 8, 9) with differences to be described below. The assembly 350 is shown mounted to the active suspension system 20c in FIG. 12, and shown by itself in FIG. 13. Assembly 350 includes the rigid mechanical seat support 360 that itself comprises central member 362 and seat supporting cross members 364 and 366. Air spring 370 is coupled to the bottom of member 362 and is supported on the vehicle floor (not shown) by pivot assembly 372 to allow the connected end of the air spring 370 to rotate about transverse axis 378 as the assembly 350 (and connected seat S) moves in the fore-aft direction. The pivot assembly 372 includes an upper portion 374 connected to the air spring 370 and a lower portion 376 supported by the vehicle floor (not shown) which allows rotational motion about the axis 378, which extends orthogonally to the fore-aft or X-direction. The air spring 370 is thereby supported by and rotatably connected to the vehicle floor, as the assembly 350 (and connected seat S) moves in the fore-aft direction.

In some exemplary embodiments, a lockout blade 400 within a lockout blade assembly 402 may be attached to one or both seat supporting cross members 364 and 366. When the user moves the lockout blade 400 to a first position, the lockout blade assembly 402 locks the isolation stage 300 in a position along the shaft 302, thereby preventing fore-aft movement of the seat S relative to the active suspension system 20c. In some examples, the lockout blade 400 engages one of a plurality of corresponding slots (not shown) located along the shaft 302, which are sized and configured to receive the lockout 400 while in the first position. When the lockout blade 400 is moved to a second position, the blade disengages the corresponding slot in the shaft 302 and permits the isolation stage 300 to move in the fore-aft direction. In some examples, the lockout blade 400 is biased within the lockout blade assembly 402, by a spring or other means, toward the first and locked position. When the blade 400 is moved to the second and unlocked position the user must overcome the bias of the lockout blade assembly 402 toward the first and locked position. In some examples, the blade assembly 402 includes a detent to control and regulate the movement of the lockout blade 400.

With renewed reference to FIG. 12, and in some exemplary embodiments, a damper assembly 410 can be included as part of isolation stage 300 which allows the seat top to move with respect to the vehicle—for example perhaps when going over a speed bump which decelerates and then accelerates the vehicle causing a fore-aft disturbance. The driver is isolated from this disturbance because the seat is allowed to maintain a more constant forward speed while the vehicle changes speed due to the bump (decelerating at first and then accelerating). In general, the isolation stage comprises a bearing system which secures the seat top to the mechanism but allows fore-aft motions. It also includes a set of springs which provide a centering force to keep the seat centered nominally so that it is ready to absorb motion when a disturbance occurs. The damper assembly 410 provides a mechanism to remove energy and to prevent or inhibit excessive or oscillatory motions. Damping can be accomplished with a hydraulic damper, or in other ways as would be apparent to one skilled in the field.

Without a damper, the seat could oscillate for multiple cycles after a disturbance. The damper removes the energy and causes the motion to decay away more rapidly (i.e., return to center of travel smoothly without excessive overshoot or with unwanted oscillations). One end of the damper assembly may be coupled to the seat. The other end may be coupled to something "stationary"—i.e., on the vehicle side of system—including components and or portions of the vehicle frame which do not move fore-aft with the seat as the seat moves relative to the vehicle. However, embodiments in which a damper is not included in a system are also contemplated as the disclosure is not so limited.

As noted previously, the above described systems and methods may be used to control movement of a seat relative to a vehicle to compensate for motion of the vehicle caused by road inputs, driver inputs, and/or other multi-directional accelerations. However, as previously noted, in some embodiments, the use of two or more non-back-drivable actuators may provide various benefits. Accordingly, somewhat similar to the above embodiments, two non-back-drivable actuators may be connected to opposing sides or portions of a seat or seat bottom. These non-back-drivable actuators may then be controlled cooperatively to control both the "heave" motion of the seat along a vertical or Z-axis of the seat and the "roll" of the seat around an axis that is parallel to an X or longitudinal axis of the seat and/or vehicle. Specific embodiments of active suspension systems including non-back-drivable actuators that may be used to control motion of a vehicle seat are detailed further below.

In one embodiment, a non-back-drivable actuator may correspond to a rotational actuator including one or more worms that are rotated by and extend from the actuator. The worms may be engaged with a corresponding worm gear with appropriately sized and shaped teeth for engaging with the worm. Rotation of the worm along one axis is transformed into rotational motion of the worm gear, and any component or structure rotatably fixed to the worm gear, into rotational motion about a second axis that may be approximately perpendicular to the axis of rotation of the worm. As detailed in regards to the figures, the worm gear may be operatively connected with one or more portions of a transmission system for transforming motion of the worm into roll and/or heave of a seat. Depending on the particular embodiment, the worm gear may either be a full worm gear (e.g. it may extend over a full 360° to form a circle) or the worm gear may only be a partial or sector worm gear that extends over a range of angles that is less than 360° (e.g. the worm gear may extend over an arc to form a semi-circular shape). Of course, it should be understood that a worm gear may have any appropriate shape and/or range of angular movement for engaging with a corresponding worm as the disclosure is not limited in this fashion.

The ability of a worm drive (i.e. an actuator coupled to a worm and corresponding worm gear) to resist being backdriven is related to a number of different design considerations. Specifically, and without wishing to be bound by theory, the mechanical advantage of a worm drive is related to a pitch of the worm versus a radius of the associated worm gear. For example, larger pitches and smaller radii are associated lower mechanical advantage whereas smaller pitches and larger radii are associated with larger mechanical advantages. Additionally, depending on the particular embodiment, a motor of an actuator may either be directly connected to a worm and/or one or more intermediate transmission components such as gears and belts may be used which may be used to provide a desired mechanical advantage between the motor and worm. The resulting overall mechanical advantage of the actuator and friction of the worm drive may interact to resist the actuator being backdriven and may provide a threshold force below which the actuator may not be substantially backdriven. For example, larger mechanical advantages and increased amounts of friction may be associated with increased resistance of an actuator to resist being backdriven. In view of the above, it should be understood that a non-back-drivable actuator may be appropriately designed using the above noted parameters to support the expected dynamic and static loads during normal operation without an substantial amount of backdriven motion. Thus, the actuator may be considered to be effectively a non-back-drivable actuator.

While a particular type of non-back-drivable actuator is described above, it should be understood that the current disclosure is not limited to the use of only non-back-drivable worm drives. For example, harmonic drives may be configured to be non-back-drivable. Additionally, ball screws with a sufficiently high mechanical advantage (i.e. if coupled to another gear reduction such as a belt drive or gear drive) may be considered to be non-back-drivable when coupled with motor friction. Further, conventional lead screws (i.e a threaded rod in a nut) can be non-back-drivable when designed with sufficient amounts of mechanical advantage and friction. In view of the above, it should be understood that an effectively non-back-drivable actuator may be considered to be any actuator including a sufficient combination of mechanical advantage and friction to support the expected static and dynamic forces during operation of a system without being substantially back driven even when the actuator is not being actively operated. Further, in some embodiments, it may be advantageous to provide increased amounts of mechanical advantage in a non-back-drivable actuator to minimize the amount of friction present in a system to provide the desired non-back-drivable characteristics of the actuator.

Figure 14:
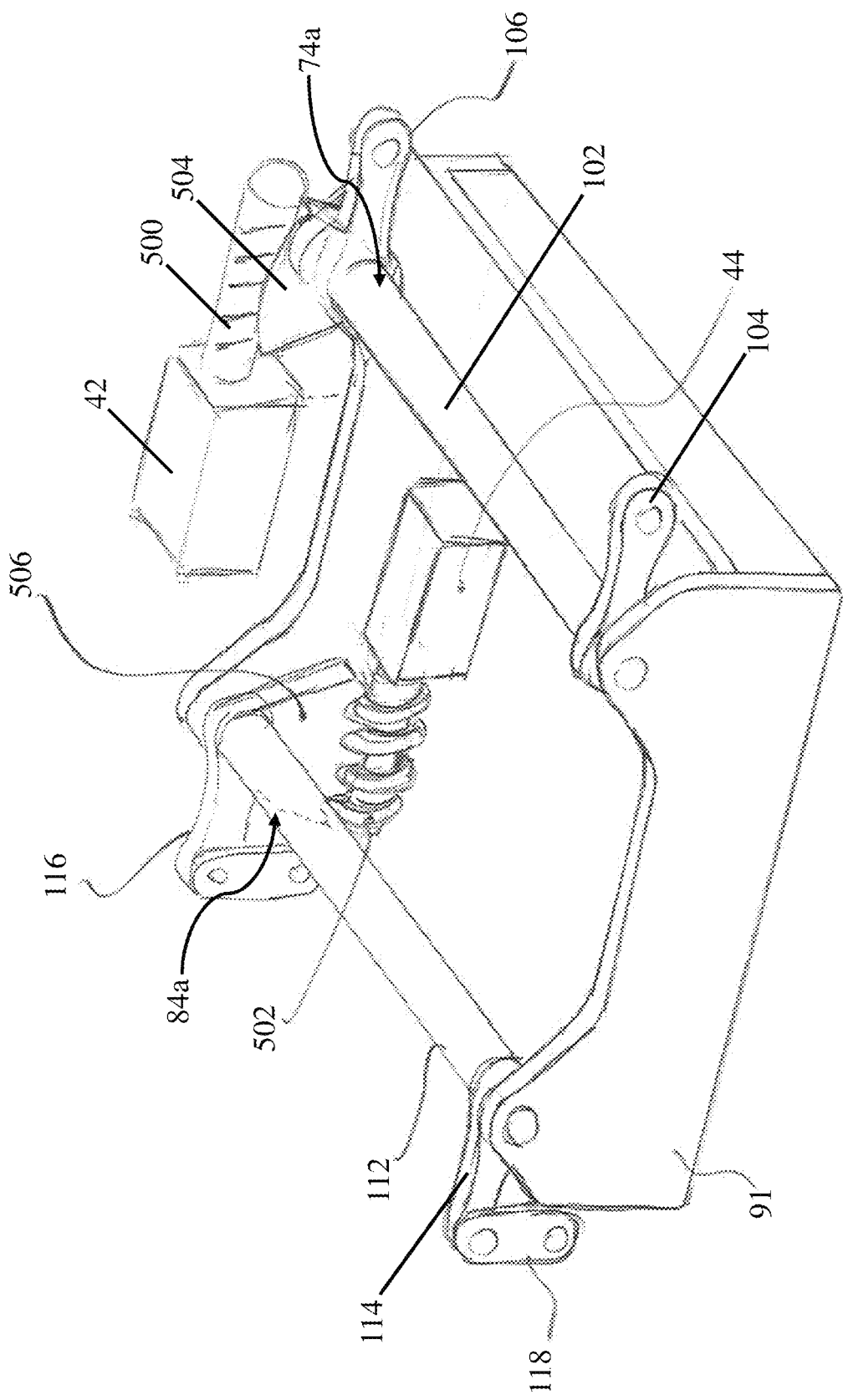
FIG. 14 is a schematic perspective view of another embodiment of an active suspension system for a vehicle seat.

FIG. 14 depicts one embodiment of an active suspension system that may be used to control motion of an associated vehicle seat using non-back-drivable actuators. As shown in the figure, the system includes a frame 91 which includes an opposing front and back portions as well as opposing side portions that extend between the front and back of the frame. Of course, while a square or rectangular frame is depicted in the figures, it should be understood that any other appropriately shaped frame capable of supporting an active suspension system relative to an underlying surface, such as an underlying vehicle interior surface, may be used as the disclosure is not limited in this fashion.

In the depicted embodiment, the active suspension system may include a first rocker arm 74a and second rocker arm 84a that extend between the front and back opposing portions of the frame 91. The rocker arms include bars 102 and 112 that are rotatably connected to, and extend between, the opposing front and back portions of the frame. However, embodiments in which the bars are rotatably connected to different portions of the frame, and/or are rotatably supported by other structures, are also contemplated. The bars may correspond to any appropriate structure capable of transmitting a torque including, for example, a hollow torque tube, a solid shaft, a solid portion of a rocker arm through which a rotational axis passes, and/or any other appropriate structure capable of transmitting torques. The rocker arms may also include one or more portions, such as links 104, 106, 114, and 116, that extend radially outward from an axis of rotation of the bars and rocker arms. Further, these links, or other radially extending portions, may be rotatably fixed to the bars, or other portion of a rocker arm, for transforming rotational motion of the bars and rocker arms into rotational and/or vertical motion of an associated portion of vehicle seat, such as a seat base, connected thereto. For example, in the depicted embodiment, the links associated with the rocker arms may be rotatably fixed to two opposing portions, such as the two opposing ends, of each of the rotatable bars.

As previously described, the links 104, 106, 114, and 116 may be constructed to be connectable to an associated portion of a vehicle seat, such as opposing sides of a vehicle seat base. As also described above, in some embodiments, one or more of the links, such as links 114 and 116 connected to the second rocker arm 84a may be rotatably connected to pivoting links 118 and 120 respectively which are connectable to the seat. These pivoting links may accommodate changes in distance between the links, rocker arms, and connected portions of a seat when the active suspension system is operated.

In the embodiment depicted in FIG. 14, the links 104 and 106 are rotatably fixed to a bar 102 of the first rocker arm and the links 114 and 116 are rotatably fixed to the bar 112 of the second rocker arm 84a. The links associated with the opposing rocker arms may be oriented outwards away from each other. Therefore, the portions of the rocker arms, i.e. the links, that are attached to an associated seat may be located outwards relative to an axis of rotation of the associated bars and/or rocker arms the links are attached to. However, embodiments in which the links, or other radially extending portions of the rocker arms extend in the opposite direction, i.e. inwards towards each other, are also contemplated as the disclosure is not so limited.

As also shown in FIG. 14, the depicted embodiment may also include a first actuator 42 and second actuator 44. The actuators may be held stationary relative to the frame 91 through either a direct or indirect connection. However, as elaborated on further below, in some embodiments one or more of the actuators may be displaceable relative to the frame in one or more directions.

As previously noted, in some embodiments, one or both of actuators 42 and 44 may be non-back-drivable actuators. For example, the first actuator includes a first rotatable worm 500 that extends outwards from the first actuator. The first worm is engaged with corresponding teeth formed on a first worm gear 504 that is rotatably fixed to a bar 102 of the first rocker arm 74a. Similarly, the second actuator includes a second rotatable worm 502 that extends outwards from the second actuator. The second worm is also engaged with corresponding teeth formed on a second worm gear 506 that is rotatably fixed to a bar 112 of the second rocker arm 84a. In the depicted embodiment, the worm gears are depicted as sector wheels that extend over a range of angles that are less than 360°. However, embodiments in which the worm gears extend over 360° to form a full circle are also contemplated.

In the depicted embodiment, the worm gears 504 and 506 are rotatably fixed to a portion of the associated bars 102 and 112 at a portion adjacent to, and/or integrated with, links 106 and 116 of the depicted rocker arms. Further, this location is depicted as being adjacent to an end of the depicted bars. However, embodiments in which the worm gears are attached at different locations along a length of the bars, or other rotatable portion of a rocker arm, are also contemplated. Additionally, while a direct connection between the worm gears and the bars of the rocker arms has been depicted, in some embodiments, the worm gears may be connected indirectly to the bars and/or any other appropriate portion of a rocker arm capable of applying a torque from the worm gears to the associated rocker arm.

As noted previously, the above-noted worms and worm gears may be appropriately designed such that they are substantially non-back-drivable when subjected to the expected static and dynamic loads applied to the actuators during operation of the active suspension system for controlling motion of a vehicle seat.

Having described the arrangement of the various components of the active suspension system depicted in FIG. 14, operation of the active suspension is now described in further detail below. Specifically, in the various operating modes detailed below, the first actuator 42 and second actuator 44 are actuated to apply various combinations of clockwise and counterclockwise torques and rotational displacements to the corresponding worm gears they are engaged with which in turn applies these torques and rotational displacements to the associated first rocker arm 74a and second rocker arm 84a.

In a first mode of operation, the first actuator 42 and second actuator 44 may be actuated to rotate the first rocker arm 74a and the second rocker arm 84a in the same direction. This will either roll an attached vehicle seat in a first direction or a second opposing direction depending on the particular direction the actuators rotate the rocker arms. For example, in reference to FIG. 14, the first and second rocker arms may both be rotated in a clockwise direction in the depicted embodiment. During such an operation, the portions of the links 104 and 106 of the first rocker arm attached to an associated seat may be displaced vertically downwards from a first orientation to a second lower orientation relative to an underlying surface of the vehicle interior. Correspondingly, the portions of the links 114 and 116 of the second rocker arm attached to a seat, and/or the corresponding pivot links 118 and 120, are displaced vertically upwards from a first orientation to a second higher orientation relative to the underlying surface of the vehicle interior. This will cause the sides of the seat, not depicted, to raise and lower correspondingly resulting in a roll of the seat. Rotation of the rocker arms in the opposite counterclockwise direction will cause the seat to roll in the opposite direction.

In a second mode of operation, the first actuator 42 and second actuator 44 may be actuated to rotate the first rocker arm 74a and the second rocker arm 84a in opposite rotational directions. Depending on the particular arrangement of the rocker arms and the directions of rotation applied to the rocker arms by the actuators, an attached vehicle seat may either be displaced vertically upwards away from, or vertically downwards towards, an underlying surface of a vehicle interior. For example, in reference to FIG. 14, the first rocker arm may be rotated in the counterclockwise direction and the second rocker arm may be rotated in the clockwise direction. This may result in the portions of the links 104, 106, 114, and 116 of the first and second rocker arms that are attached to an associated seat being displaced vertically upwards. This vertical upwards displacement of the links correspondingly displace an attached seat in the vertical upwards direction as well. Similarly, when the first and second rocker arms are displaced in the opposite directions, the portions of the links attached to an associated vehicle seat may be displaced downwards which causes the vehicle seat to be displaced downwards as well.

In a third mode of operation, the first actuator 42 and second actuator 44 may be actuated using a combination of the above noted modes of operation. Specifically, depending on the particular desired motion the actuators may be operated such that the portions of the rocker arms attached to an associated vehicle seat may move by different amounts either vertically upwards and/or downwards. This may create a combination of both roll and heave (i.e. rotation and vertical displacement relative to an underlying surface of the vehicle interior) that may be applied to the vehicle seat. For example, combinations of roll and heave may be applied to a seat by rotating the first and second rocker arms in the following ways: rotating the first and second rocker arms in the same direction with different rotational displacements; rotating the first and second rocker arms in opposite directions with different amounts of rotational displacement; and/or rotating one of the rocker arms while holding the other rocker arm stationary. Depending on the particular arrangement of the rocker arms and specific applied rotational displacements, this may move the attached vehicle seat vertically upwards or downwards while also applying either a positive or negative rotation to the seat.

In the embodiment depicted in FIG. 14, the first and second actuators 42 and 44 are disposed within an interior portion of the active suspension system. The two worms 500 and 502 associated with the two actuators extend laterally outwards towards the sides of the active suspension system's frame 91 where they are engaged with the corresponding worm gears 504 and 506. However, the current disclosure is not limited to the specific arrangement of actuators, worms, worm gears, and rocker arms depicted in this figure. Instead, the current disclosure encompasses any number of different arrangements of these features including the embodiments described below relative to FIGS. 15-18.

Figure 15:
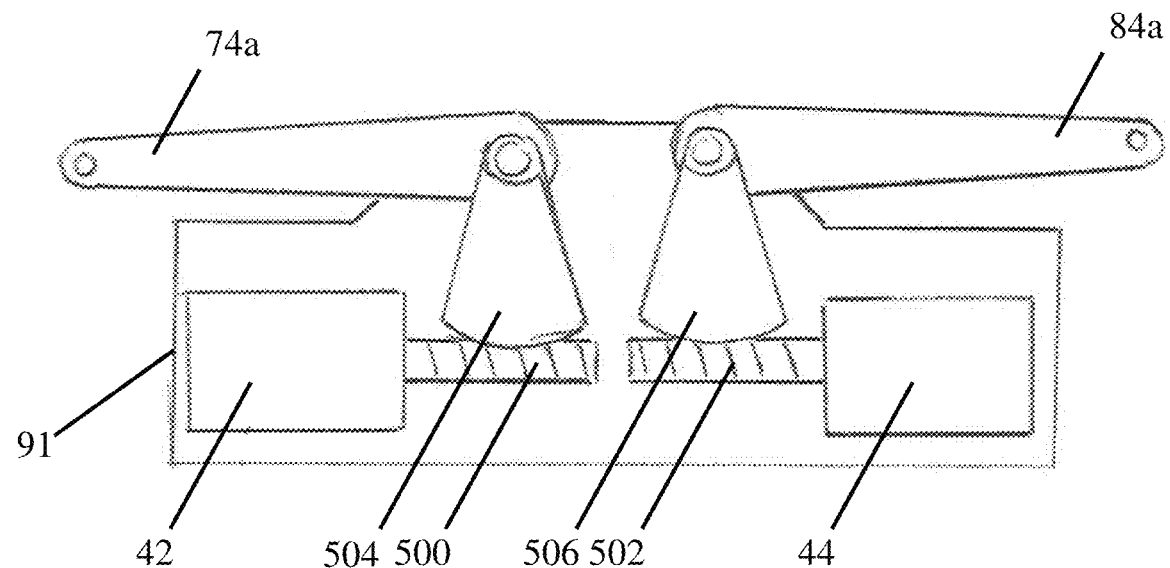
FIG. 15 is a schematic side view of another embodiment of an active suspension system for a vehicle seat.

FIG. 15 depicts one embodiment of an active suspension system that may include an increased stroke length for increased range of motion for an attached vehicle seat. In the depicted embodiment, the first and second actuators 42 and 44 may be disposed adjacent to opposing exterior portions of the active suspension system. The associated worms 500 and 502 may extend from the associated actuators inwards towards the corresponding worm gears 504 and 506 that they are engaged with. Correspondingly, this may permit the rocker arms 74a and 84a to have axes of rotation that are located closer to a vertically oriented mid-plane of the active suspension system relative to the vehicle's frame of reference. By having the worm drives and axes rotation of the rocker arms disposed between a vertical mid-plane of the active suspension system and the corresponding actuators, it is possible to use rocker arms radially extending portions, such as the above noted links, with longer lengths than those described above. These increased lengths may provide an increased radius of rotation for the rocker arms with correspondingly increased vertical displacements of a portion of a seat connected to the rocker arms for similar amounts of rotational displacement. In the depicted embodiment, the first and second actuators are depicted as being located in plane with one another. However embodiments in which the first and second actuators are vertically offset from one another relative to an underlying surface of a vehicle interior are also contemplated.

Figure 16:
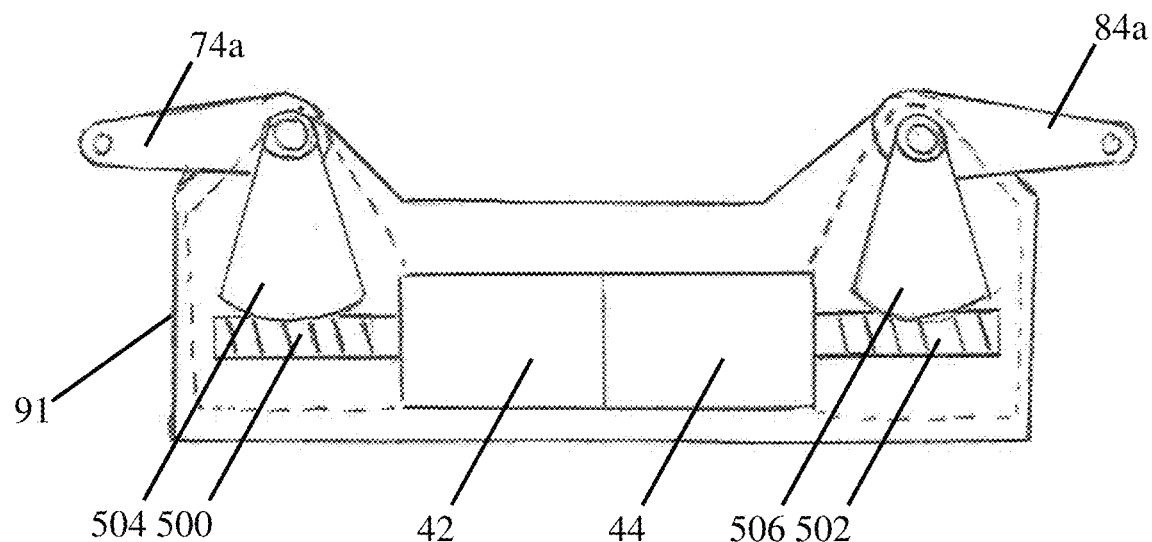
FIG. 16 is a schematic side view of another embodiment of an active suspension system for a vehicle seat.
Figure 17:
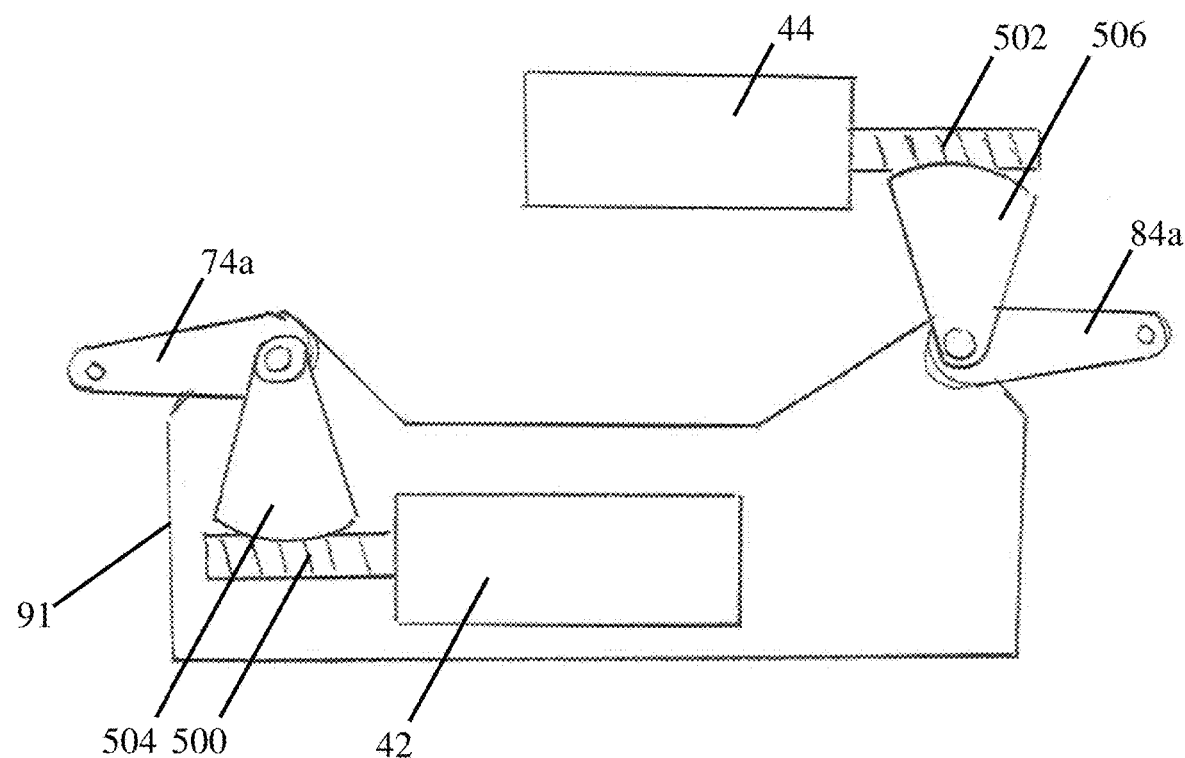
FIG. 17 is a schematic side view of another embodiment of an active suspension system for a vehicle seat.

FIGS. 16 and 17 depict another embodiment of an active suspension system that may be used to control motion of a vehicle seat connected thereto. In the depicted embodiment, the active suspension system includes first and second actuators 42 and 44. These actuators are disposed within an interior portion of the active suspension system. The associated first and second worms 500 and 502 of the first and second actuators extend laterally outwards from the associated actuators towards opposing sides of the active suspension system frame 91 where the worms are engaged with corresponding first and second worm gears 504 and 506. In such an arrangement, the first and second rocker arms 74a and 84a, and their associated axes of rotation, may be located laterally outwards relative to the first and second actuators.

As shown in FIG. 16, in some embodiments, the first and second actuators 42 and 44 may be coaxial with one another such that the axis of rotation of the corresponding worms 500 and 502 may be aligned with one another. Further, in some embodiment, these coaxial actuators may include opposing surfaces that are disposed against one another. Without wish to be bound by theory, such an arrangement may help to mitigate opposing loads applied to the first and second actuators during operation. However, as shown in FIG. 17 embodiments in which the first and second actuators are vertically offset from one another relative to an underlying surface of a vehicle interior also contemplated. In such an embodiment, the worms 500 and 502 may either be oriented in the same or different directions to engage with the corresponding worm gears 504 and 506. Additionally, while not depicted in the figures, the first and second actuators may also be horizontally offset from one another relative to the underlying surface of the vehicle interior as the disclosure is not limited in this fashion.

Figure 18:
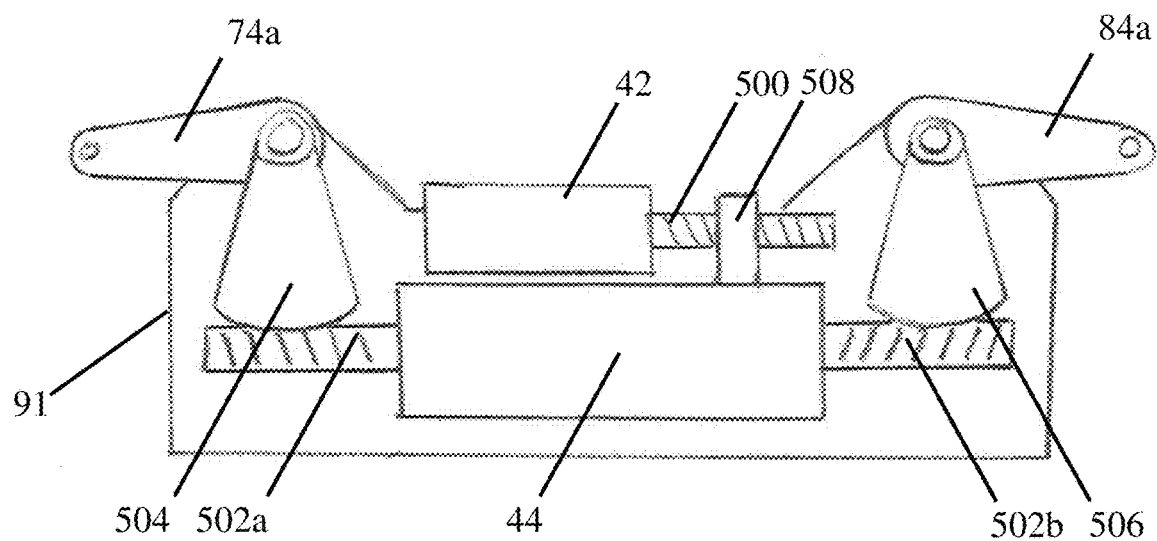
FIG. 18 is a schematic side view of another embodiment of an active suspension system for a vehicle seat.

FIG. 18 depicts an embodiment of an active suspension system where a first actuator 42 may be used to control roll of a vehicle seat attached to the suspension system and a second actuator 44 that may be used to control heave of a vehicle seat attached to the suspension system. The arrangement and operation of these actuators is detailed further below.

In the depicted embodiment, the first actuator 42 may be fixed in place relative to a frame 91 of the active suspension system and/or an underlying surface of the vehicle interior. The first actuator 42 includes a first worm 500 that extends outwards from the first actuator and is engaged with a threaded portion of a support 508. The support 508 may be free to move in an axial direction in response to rotation of the first worm. For example, the first worm may be engaged with the threaded portion of the support while the first actuator is prevented from moving axially. The support 508 may be fixed to a second actuator 44. The first actuator may be rotatably fixed relative to the support through the use of any appropriate arrangement including for example rails, pin and groove arrangements, and/or any other appropriate support structure capable of preventing rotational motion of the first actuator relative to the support while permitting axial movement of the support and connected second actuator. Thus, when the first worm is rotated, the support and second actuator may be moved in either a first axial direction and/or an opposing second axial direction depending on the direction of rotation of the first worm of the first actuator.

As also shown in the figure, the second actuator 44 may include two worms, i.e. second and third worms 502*a* and 502*b*, that extend outwards from two opposing sides of the second actuator in opposite directions. The second worm may be engaged with a first worm gear 504 that may be rotatably fixed to a first rocker arm 74*a* as previously described above. Similarly, the third worm may be engaged with a second worm gear 506 that is rotatably fixed to a second rocker arm 84*a*. In some embodiments, the second and third worms may be formed on a single shaft that extends through the second actuator, and the second and third worms may have threads that are oriented in opposing directions. For example, one worm may have a left-handed (LH) thread and the other worm may have a right-handed (RH) thread. Correspondingly, when the second actuator is actuated, the second and third worms may rotate in the same direction while rotating the first and second worm gears, as well as the associated rocker arms, in opposite directions relative to one another. As described above, rotation of the rocker arms in opposing directions moves the radially extending portions of the rocker arms connected to an associated vehicle seat either vertically up or down relative to an underlying surface of the vehicle interior. Thus, actuation of the second actuator may be used to control heave of a connected vehicle seat.

In some embodiments, the first actuator 42 may be disposed on and/or may be axially fixed to the second actuator 44. The first actuator may be axially fixed to the second actuator using any appropriate connection including both direct and indirect connections. In either case, when the first actuator is actuated to axially displace the first actuator in an axial direction due to rotation of the associated first worm 500, the second actuator may also be axially displaced in the same axial direction. This axial movement of the second actuator results in a corresponding axial movement of the associated second and third worms 502*a* and 502*b* in the same direction which produces a corresponding rotation of the associated first and second worm gears 504 and 506. Due to the arrangement of the worm gears and associated worms, the worm gears rotate in the same direction. Therefore, when the first actuator is actuated to rotate the first worm in a first direction, the worm gears and associated rocker arms are rotated in a first rotational direction. Correspondingly, when the first actuator is actuated to rotate the first worm in a second opposite direction, the worm gears and associated rocker arms are rotated in a second opposing rotational direction. As described previously rotation of the rocker arms in opposing directions from one another may be used to control roll of a vehicle seat attached to the rocker arms. Thus, actuation of the first actuator may be used to control roll of the attached vehicle seat.

In view of the above, the first and second actuators 42 and 44 may be operated cooperatively to control both a roll and heave of a vehicle seat attached to the depicted active suspension system. Without wishing to be bound by theory, the depicted arrangement of the first and second actuators may provide several benefits. For example, due to the second actuator supporting the loads associated with controlling heave of the associated vehicle seat, reduced axial loads may be applied to a frame and/or underlying portion of the vehicle interior in such an embodiment. Additionally, such an arrangement may provide a more compact mechanism that occupies less of the limited space available beneath typical vehicle seats.

In the above described embodiments, it should be understood that the actuators and associated components engaged with the rocker arms, such as the above described worms and worm gears, may be located in any appropriate portion of an active suspension system and may be oriented in any appropriate direction. However, in one embodiment, the actuators and associated moving components may be disposed within a front portion of the active suspension system that is located adjacent to a front portion of an attached vehicle seat. This may place the actuators and moving components further away from an opposing rear portion of the active suspension system that is located adjacent to a rear of the seat. Such an arrangement may help to physically isolate the moving components of the active suspension system to avoid unintentional damage or obstruction of the components while also providing additional open space under the seat for rear seat occupants.

As previously discussed, in some embodiments, it may be desirable to include one or more components in an active suspension system that help to partially bear the weight of a vehicle seat and its occupant. Without wishing to be bound by theory, by offsetting the weight of the passenger and seat, the friction levels in the active suspension system may be reduced and the amount of power required to operate the system may be reduced without compromising performance.

Figure 19:
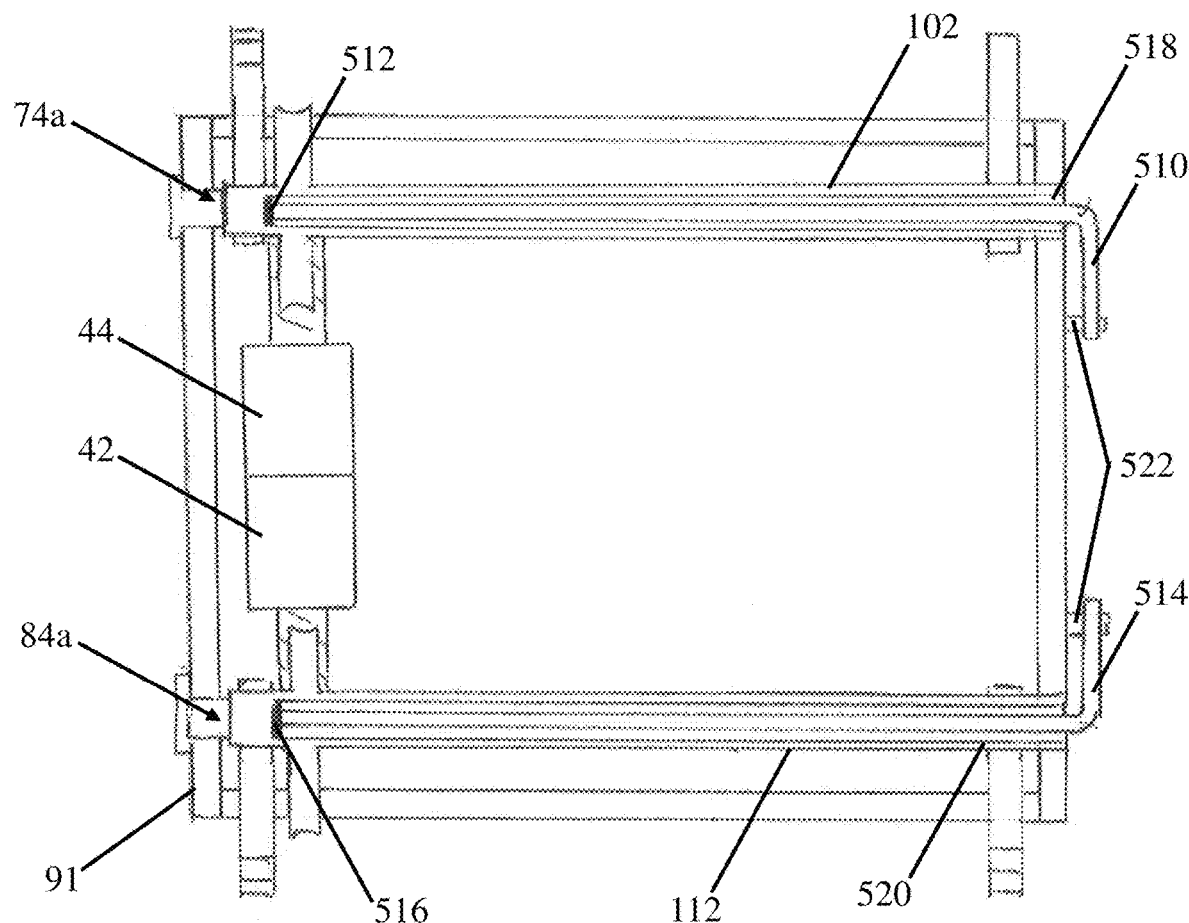
FIG. 19 is a schematic top view of another embodiment of an active suspension system for a vehicle seat.
Figure 20:
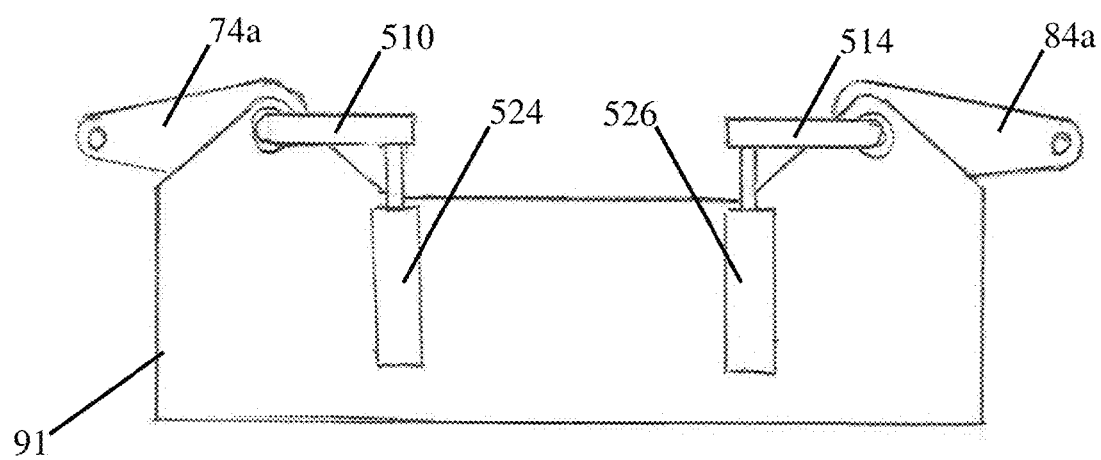
FIG. 20 is a schematic side view of an active suspension system including a variable torsion spring.

FIGS. 19-20 show one embodiment of an active suspension system that is constructed to at least partially support the weight of a vehicle seat and its occupant without operation of the associated actuators. Specifically, as detailed further below, one or more torsion springs may be incorporated into a system to at least partially support the weight of a vehicle seat and its occupant.

In the depicted embodiment, an active suspension system may have a similar arrangement to those described above. Specifically, first and second actuators 42 and 44 may be operatively coupled to rotatable first and second bars 102 and 112 of first and second rocker arms 74a and 84a. In some embodiments, the depicted actuators may be non-back-drivable actuators. However, embodiments in which back-drivable actuators are used are also contemplated.

To help bear the loads applied to the first and second rocker arms 74a and 84a, a first torsion spring 510 may be operatively coupled to the first bar 102 of the first rocker arm to apply a torque to the first bar. Similarly, a second torsion spring 512 may be operatively coupled to the second rocker arm to apply a torque to the second bar. The torsion springs may be constructed and arranged such that the torques they apply to the associated bars of the rocker arms are oriented support a weight of the vehicle seat and occupant. In some instances these torques applied to the bars of the rocker arms may be considered to be applied in parallel to the torques applied to the first and second rocker arms by the associated first and second actuators. Thus, the torsion springs may apply a secondary torque to the bars, or other portion, of the rocker arms that is separate from the torques applied by the associated actuators to support at least a portion of the loads applied during operation.

The figures show one possible embodiment in which one or more torsion springs may be integrated with an active suspension system. As shown in the figures, the first and second rotatable bars 102 and 112 of the first and second rocker arms 74a and 84a may include internal cavities 518 and 520 that pass at least partially, and in some instances completely, through the associated bars. In the depicted embodiment, the first and second torsion springs 510 and 512 are torsion spring bars that are disposed at least partially in, and may extend out of, the corresponding cavities of the bars they are associated with. In some embodiments, the torsion springs may be coaxially arranged with the associated bars. The first and second torsion springs may be rotatably fixed relative to the first and second bars of the rocker arms respectively. For example, an end portion of the first torsion spring may be rotatably fixed to the first bar at a first connection 512 located within the first cavity. Similarly, an end portion of the second torsion spring may be rotatably fixed to the second bar at a second connection 514 located within the second cavity. Appropriate types of connections may include, but are not limited to welds, pins, threaded fasteners, brazed joints, adhesives, mechanically interlocking features, and/or any other appropriate form of connection capable of rotatably fixing the torsion springs to an associated bar or other rotatable component of a rocker arm.

To apply the desired torques to the associated rocker arms, the active suspension systems may include supports 522 that may support an end of an associated torsion spring. For example, as shown in the figures, the torsion springs 510 and 514 may include end portions, which are depicted as a bent end on the torsion spring bars, that are rotatably fixed in place relative to a frame 91 of the active suspension system by the supports. Specifically, as shown in the figures, the supports may correspond to any appropriate feature that is capable of engaging with and preventing rotation of an attached portion of a torsion spring including, for example, protrusions that prevent rotation, mechanically interlocking features, fasteners, welds, interference fits, and/or any other appropriate structure. Further, in some embodiments, the torsion springs may be integrated with the rocker arms and/or frame of the active suspension system such that the torsion springs do not obstruct an opening in the rear of a connected vehicle seat.

During operation, the first and second actuators 42 and 44 may be operated to apply a first torque to the associated first and second rocker arms 74a and 84a respectively to move the first and second rocker arms to desired orientations. The above noted first and second torsion springs 510 and 514 may apply a corresponding second torque to each of the rocker arms that is applied in parallel to the torques applied by the associated actuators. These secondary torques may be applied during both static and dynamic operation and may be viewed as at least partially, and in some embodiments completely, supporting at least the static loads, and at least a portion of the dynamic loads, applied to the rocker arms during operation. Thus, the use of the torsion springs may enable the actuators to operate at reduced torque levels during both active and static operation, reduce friction on startup, and reduce overall power consumption.

In some embodiments, it may be desirable to vary a torque applied to a rocker arm by an associated torsion spring. For example, a torque may be varied to support different loads applied to a vehicle seat corresponding to passengers, and/or other loads, supported on the seat which may have different weights. Similar to the embodiments described above, FIG. 20 depicts an active suspension system including first and second rocker arms 74a and 84a along with corresponding first and second torsion springs 510 and 514. However, unlike the static supports described above, an end portion of one or more of the torsion springs may be supported by a movable support such as an output shaft of one or more linear actuators 524 and 526. Specifically, the linear actuators may be operated to displace an end of the associated torsion spring which causes the torsion spring to twist about its axis of rotation. Depending on the direction of the actuation, this may either result in an increased or decreased amount of torque applied to a rocker arm by the associated torsion spring.

While the use of linear actuators to displace the ends of torque bars to vary an applied torque has been shown in the figures, the current disclosure is not limited to only the depicted embodiment. For example in another embodiment a helical torsion spring may include an end portion that is connected to a rotatable drive shaft which may be driven by an associated rotational actuator to vary an amount of torque provided by the torsion spring. In either case, it should be understood that any appropriate type of actuator and/or method that may be used to vary the torque applied by a torsion spring to an associated rocker arm may be used as the disclosure is not limited in this fashion.

The above noted embodiments depict a system that includes torsion spring bars that are coaxially disposed within interior cavities of associated rotatable bars. However, other embodiments with different types and arrangements of torsion springs are contemplated. For example, torsion springs may be: offset from the rotation axis of an associated bar or rocker arm; disposed around an exterior of the associated bar or rocker arm; disposed adjacent to an associated bar or rocker arm, and/or removed from an associated rotatable bar or rocker arm. Additionally, the disclosed torsion springs may be indirectly coupled as the disclosure is not limited to only direct couplings with torsion springs. It should also be understood that any appropriate type of torsion spring may be used to apply the desired torques. For example appropriate types of torsion springs may include, but are not limited to, solid torsion spring bars, torsion spring tubes, helical torsion springs, and/or any other appropriate type of torsion spring.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An active suspension system configured to support a vehicle seat relative to a floor of a vehicle, the active suspension system comprising:
   a first actuator of the active suspension system;
   a first rocker arm operatively connected to the first actuator, wherein the first rocker arm is operatively coupled to the vehicle seat such that rotation of the first rocker arm induces motion of the vehicle seat relative to the floor of the vehicle, wherein the first actuator is constructed to apply a torque to the first rocker arm; and
   a first torsion spring, wherein the first torsion spring applies a torque to the first rocker arm.

2. The active suspension system of claim 1, further comprising a second actuator, a second rocker arm, and a second torsion spring, wherein the second rocker arm is operatively connected to the second actuator, wherein the second rocker arm is constructed to be connected to the vehicle seat, wherein the second actuator is constructed to apply a torque to the second rocker arm, and wherein the second torsion spring applies a torque to the second rocker arm.

3. The active suspension system of claim 1, wherein the first torsion spring is a first torsion bar spring.

4. The active suspension system of claim 1, wherein the torque applied to the first rocker arm by the first torsion spring is variable.

5. The active suspension system of claim 1, wherein the first actuator is a non-back-drivable actuator.

6. The active suspension system of claim 2, wherein the second actuator is a non-back-drivable actuator.

7. The active suspension system of claim 2, wherein the second torsion spring is a second torsion bar spring.

8. The active suspension system of claim 7, wherein the first torsion spring and the second torsion bar spring are configured to move independently and relative to one another.

9. A method of operating an active suspension system to support a vehicle seat relative to a floor of a vehicle, the method comprising:
   applying a first torque to a first rocker arm connected to the vehicle seat with a first actuator; and
   applying a second torque to the first rocker arm in parallel with the first torque.

10. The method of claim 9, further comprising applying a third torque to a second rocker arm connected to the vehicle seat with a second actuator, and applying a fourth torque to the second rocker arm in parallel with the third torque.

11. The method of claim 9, wherein the second torque is applied with a torsion spring.

12. The method of claim 9, further comprising varying the second torque.

13. The method of claim 9, wherein the first actuator is a non-back-drivable actuator.

* * * * *